United States Patent
Huang et al.

(10) Patent No.: US 8,103,098 B2
(45) Date of Patent: Jan. 24, 2012

(54) METHOD FOR GENERATING A NON-GRAPHICAL DIGITAL IMAGE FROM AN ORIGINAL DIGITAL IMAGE

(75) Inventors: Ying-Jieh Huang, Taipei County (TW); Wu-Jie Liao, Changhua County (TW); Pai-Yu Tien, Taipei (TW)

(73) Assignee: Primax Electronics Ltd., Neihu, Taipei (TW)

(*) Notice: Subject to any disclaimer, the term of this patent is extended or adjusted under 35 U.S.C. 154(b) by 812 days.

(21) Appl. No.: 12/203,910

(22) Filed: Sep. 3, 2008

(65) Prior Publication Data

US 2010/0054583 A1    Mar. 4, 2010

(51) Int. Cl.
*G06K 9/34* (2006.01)

(52) U.S. Cl. .......... 382/176; 382/173; 382/180

(58) Field of Classification Search .......... None
See application file for complete search history.

(56) References Cited

U.S. PATENT DOCUMENTS

| | | | | |
|---|---|---|---|---|
| 5,767,978 A * | 6/1998 | Revankar et al. | 358/296 |
| 6,628,833 B1 * | 9/2003 | Horie | 382/173 |
| 6,993,190 B1 * | 1/2006 | Nguyen | 382/199 |
| 7,019,761 B2 * | 3/2006 | Srinidhi et al. | 345/643 |
| 7,170,647 B2 * | 1/2007 | Kanatsu | 358/453 |
| 7,379,594 B2 * | 5/2008 | Ferman et al. | 382/176 |
| 7,672,022 B1 * | 3/2010 | Fan | 358/474 |
| 7,965,892 B2 * | 6/2011 | Kanatsu | 382/176 |
| 2006/0165287 A1 * | 7/2006 | Huang | 382/176 |
| 2008/0267497 A1 * | 10/2008 | Fan | 382/173 |
| 2009/0074291 A1 * | 3/2009 | Iinuma | 382/178 |

OTHER PUBLICATIONS

J. Gllavata, et al. "A robust algotithm for text detection in images", Proc. of the 3rd international symposium on image and signal processing and analysis, 2003.*
C. Liu, et al. "Text detection in images based on unsupervised classification of edge-based features", ICDSR, 2005.*
Z. Lu, "Detection of text region from digital engineering drawings", IEEE Trans. on Pattern Analysis and Machine Intelligence, vol. 20, No. 4, 1998.*
V. Wu, et al. "Finding text in images", Proc. ACM Int. Conf. Digital Libraries, 1997.*

* cited by examiner

*Primary Examiner* — Li Liu
(74) *Attorney, Agent, or Firm* — Winston Hsu; Scott Margo

(57) ABSTRACT

A method for generating a non-graphical digital image from an original digital image includes the following steps: performing edge detection to generate a third digital image, performing screen dot detection to detect the photo regions in the original digital image, detecting color regions in the original digital image, removing the photo regions and the color regions from the third digital image to generate the non-graphical digital image.

3 Claims, 32 Drawing Sheets

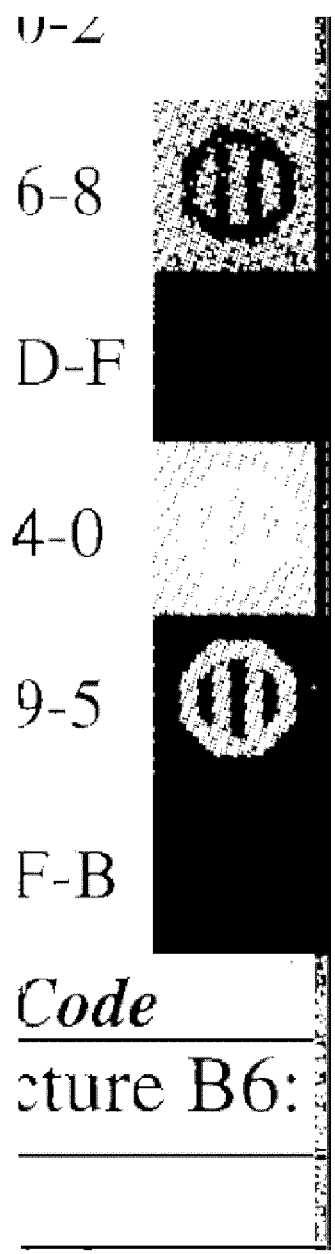
FIG. 9 The dilation result of FIG. 7
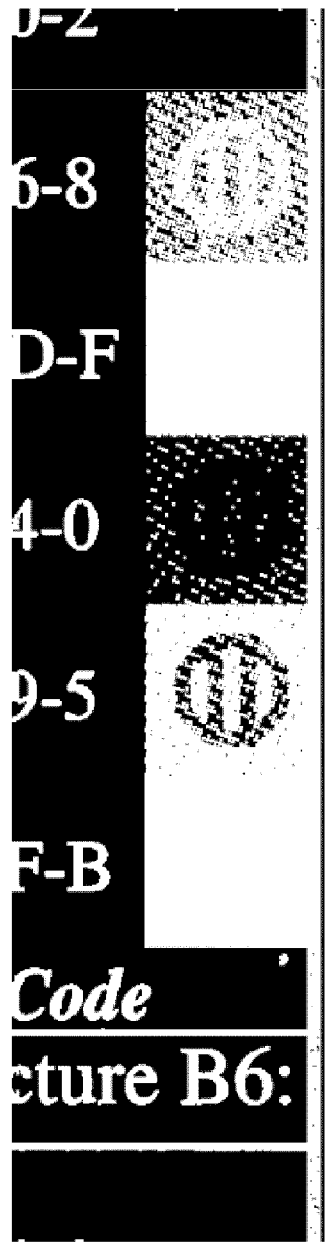
FIG. 10 The dilation result of FIG. 8

The normalized spectrum images of uniform patches of monochrome photos of 200 lpi The spectrum images of multipass-color photos
(with moire structure) of 200 lpi Screen dots derived from Discrete Fourier Transform according to FIG. 3

Predetermined line patterns stored in the storage device of the executing system The result derived from peak block connection according to FIG. 3

The result of removing the blocks chosen incorrectly according to FIG. 3

The left drawing is a block in the detected region of r*s blocks including a screen block, and the right drawing is outputting the block as a screen block FIG. 38 The result of expanding the detected region of the photo according to FIG. 3

Choosing neighboring pixels when the number of lines per inch is greater

Choosing neighboring pixels when the number of lines per inch is less

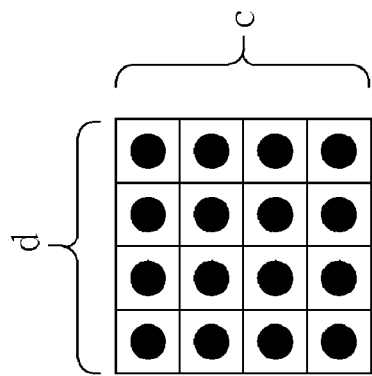
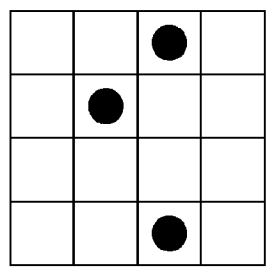
Or
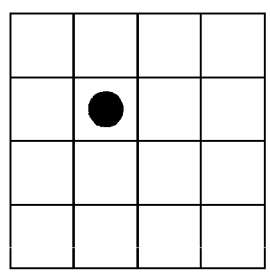 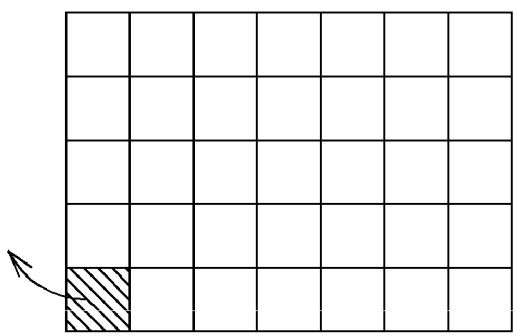
FIG. 43
The procedures of integrating the detected screen dots The result of edge detection according to FIG. 3

The result of screen dot detection according to FIG. 3

The result of removing the detected edges from the photo detected by the screen dot detection according to FIG. 45 and FIG. 44

The chrominance distribution according to CaCb data

The detected edges including text and color lines after performing steps 100, 200, 300 in FIG. 5

The result of removing the detected edges from the detected color regions according to FIG. 3 and FIG. 48

METHOD FOR GENERATING A NON-GRAPHICAL DIGITAL IMAGE FROM AN ORIGINAL DIGITAL IMAGE

BACKGROUND OF THE INVENTION

1. Field of the Invention

The present invention relates to a method for categorizing contents of a digital image, especially a method for generating a non-graphical digital image from an original digital image.

2. Description of the Prior Art

In the field of image processing, it is becoming increasingly common to choose a digital means of image capture and storage over more conventional means. One of the advantages of digital image storage is the ease for users to edit images. In other words, a digital image can be easily edited, enhanced, or copied through digital image processing. This means that new levels of simplicity and flexibility have been introduced to users in a digital image-editing environment, and accordingly, many techniques are developed and improved to add values in functionality of digital image processing.

In digital image processing, if a page needs to be captured into a digital file by an image-capturing device, such as a digital camera or a scanner, the photo on that page will be processed through a screening technique to change continuous tones into limited tone levels, such as the commonly-used halftone technique, and the other parts of the page such as lines, text and graphics will be transformed into solid spot. A screen dot is different from a pixel, used to form a photo image on a printed matter, and the size of the screen dot is proportional to tone response of pixels. Sometimes the size of a screen dot is equal to that of a plurality of pixels. The photo is screened while printing, and the screened results of each color are overlapped to form a structure of rosette and moiré. In this way, the tones of an output halftone image on the printed page can be seen equally to the continuous tones of the original photo image.

Please refer to FIG. 1. FIG. 1 shows a printed page 10 generated through digital image processing according to the prior art. The printed page 10 includes a photo 11, graphics 12, and text 13. The printed page 10 is printed according to an original page after scanned by a scanner; therefore, according to the abovementioned technique, the photo 11 of the printed page 10 is rich in moiré formed by screen dots. The graphics 12 in the printed page 10 include color marks, and graphics. The text 13 in the printed page 10 is written in neutral color (without chrominance). Please note that the definition of a graphical region here includes photos and graphics, photos in the printed page are formed by screen dots, and graphics are defined as marks, or artificially added articles with uniform and bright colors. Text includes word-lines or marks with a high luminance contrast to the background region but without any chrominance. That is "text" only means text written in neutral color, however, color text is treated as a graphic. According to the conventional technique, edges with a high luminance contrast to the background, including all the word-lines, are detected by an edge detection method. An edge is defined as a border between two sides having a luminance contrast above a luminance threshold. The conventional edge detection method utilizes an operator, given as follows, or a mask to detect whether there is an edge in a predetermined region or not:

$$\begin{bmatrix} -1 & 0 & 1 \\ -1 & 0 & 1 \\ -1 & 0 & 1 \end{bmatrix}$$

From this operator, we can see the (1,1) entry is −1, and the (3,1) entry is 1, which means the operator is subtracting the luminance of the left pixel from the luminance of the right pixel. Hence, one operator can only detect the luminance difference in one direction, and many operators should be applied when detecting each direction. Therefore, a lot of resources are needed and operating cost is increased accordingly. Moreover, the conventional edge detection method detects luminance of the whole printed page, including regions of middle luminance, which should not belong to the text. Please refer to FIG. 2 for an example. FIG. 2 is a drawing of the detected results including text and undesired edges according to the conventional edge detection method.

If a user wants to edit the printed page 10, for example performing an enhancement in the text 13 of the printed page 10, most methods of digital image processing according to the prior art adjust the whole image in the printed page 10 so as to get the stress effect of the text 13. But this makes the other parts in the printed page 10, such as graphics, which do not need enhancement, also be enhanced. This often creates some unexpected defects and unwanted results in exhibition of the whole image.

SUMMARY OF THE INVENTION

The embodiment of the present invention releases a method for generating a non-graphical digital image from an original digital image, comprising following steps: detecting first areas of the original digital image whose luminance values are above a first predetermined luminance threshold; detecting second areas of the original digital image whose luminance values are below a second predetermined luminance threshold, the second predetermined luminance threshold being smaller than the first predetermined luminance threshold; dilating the first areas to generate a first digital image; dilating the second areas to generate a second digital image; generating a third digital image including edges from dilated first and second areas; performing screen dot detection in the original digital image for detecting photo regions; detecting color regions in the original digital image; and removing the photo regions and the color regions from the third digital image to generate the non-graphical digital image.

Another embodiment of present invention further releases a method for generating a non-graphical digital image from an original digital image, comprising following steps: performing edge detection in the original digital image to generate a third digital image comprising edges between first areas whose luminance values are above a first predetermined luminance threshold and second areas whose luminance values are below a second predetermined luminance threshold; performing screen dot detection in the original digital image for detecting photo regions; detecting color regions in the original digital image; and removing screen blocks detected in the seventh digital image and the color regions from the third digital image to generate the non-graphical digital image. Performing screen dot detection in the original digital image for detecting photo regions comprises: analyzing a number of lines per inch in a predetermined coordinate region in the original digital image by performing Discrete Fourier Transform to determine if the predetermined coordinate region is a screen block; generating a fourth digital image comprising a plurality of screen blocks according to analyzed results; generating a fifth digital image by setting blocks between two screen blocks which match a predetermined pattern and are of a same dimension as screen blocks; and generating a sixth digital image; generating a seventh digital image by setting a block as a screen block within a fourth set of blocks when there is at least one screen block besides the block within the fourth set of blocks. Generating a sixth digital image is performed by: setting a left-most and top-most block in the fifth digital image as a screen block or a non-screen block according to a number of screen blocks besides the left-most and top-most block within a first set of blocks in the fifth digital image, and generating the sixth digital image; and setting a block in a second set of blocks in the sixth digital image as a screen block or a non-screen block according to a number of screen blocks besides the block within the second set of blocks in the sixth digital image, and a number of screen blocks besides the block within a third set of blocks in the fifth digital image, and updating the sixth digital image, the block being a center block of the third set of blocks.

Another embodiment of the present invention further releases a method for generating a non-graphical digital image from an original digital image, comprising the following steps: performing edge detection in the original digital image to generate a third digital image comprising edges between first areas whose luminance values are above a first predetermined luminance threshold and second areas whose luminance values are below a second predetermined luminance threshold; performing screen dot detection in the original digital image for detecting photo regions; detecting color regions in the original digital image; and removing screen blocks detected in the seventh digital image and the color regions from the third digital image to generate the non-graphical digital image. Performing screen dot detection in the original digital image for detecting photo regions comprises generating a eighth digital image by setting a center pixel of a first block of pixels as a screen dot according to luminance differences between the center pixel and neighboring pixels chosen according to a predetermined rule within the first block; generating a ninth digital image by setting a second block of pixels as a screen block when there is at least one screen dot within the second block; generating a fifth digital image by setting blocks between two screen blocks, which match a predetermined pattern and are of a same dimension as screen blocks; generating a sixth digital image; and generating a seventh digital image by setting a block as a screen block within a fourth set of blocks when there is at least one screen block besides the block within the fourth set of blocks. Generating a sixth digital image is performed by: setting a left-most and top-most block in the fifth digital image as a screen block or a non-screen block according to a number of screen blocks besides the left-most and top-most block within a first set of blocks in the second digital image, and generating the sixth digital image; and setting a block in a second set of blocks in the sixth digital image as a screen block or a non-screen block according to a number of screen blocks besides the block within the second set of blocks in the sixth digital image, and a number of screen blocks besides the block within a third set of blocks in the fifth digital image, and updating the sixth digital image, the block being a center block of the third set of blocks.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 9 is a first digital image including the dilation result of FIG. 7.

FIG. 10 is a second digital image including the dilation result of FIG. 8.

FIG. 43 is a drawing of the procedures of integrating the detected screen dots according to the second embodiment of the present invention.

DETAILED DESCRIPTION

Figure 1:
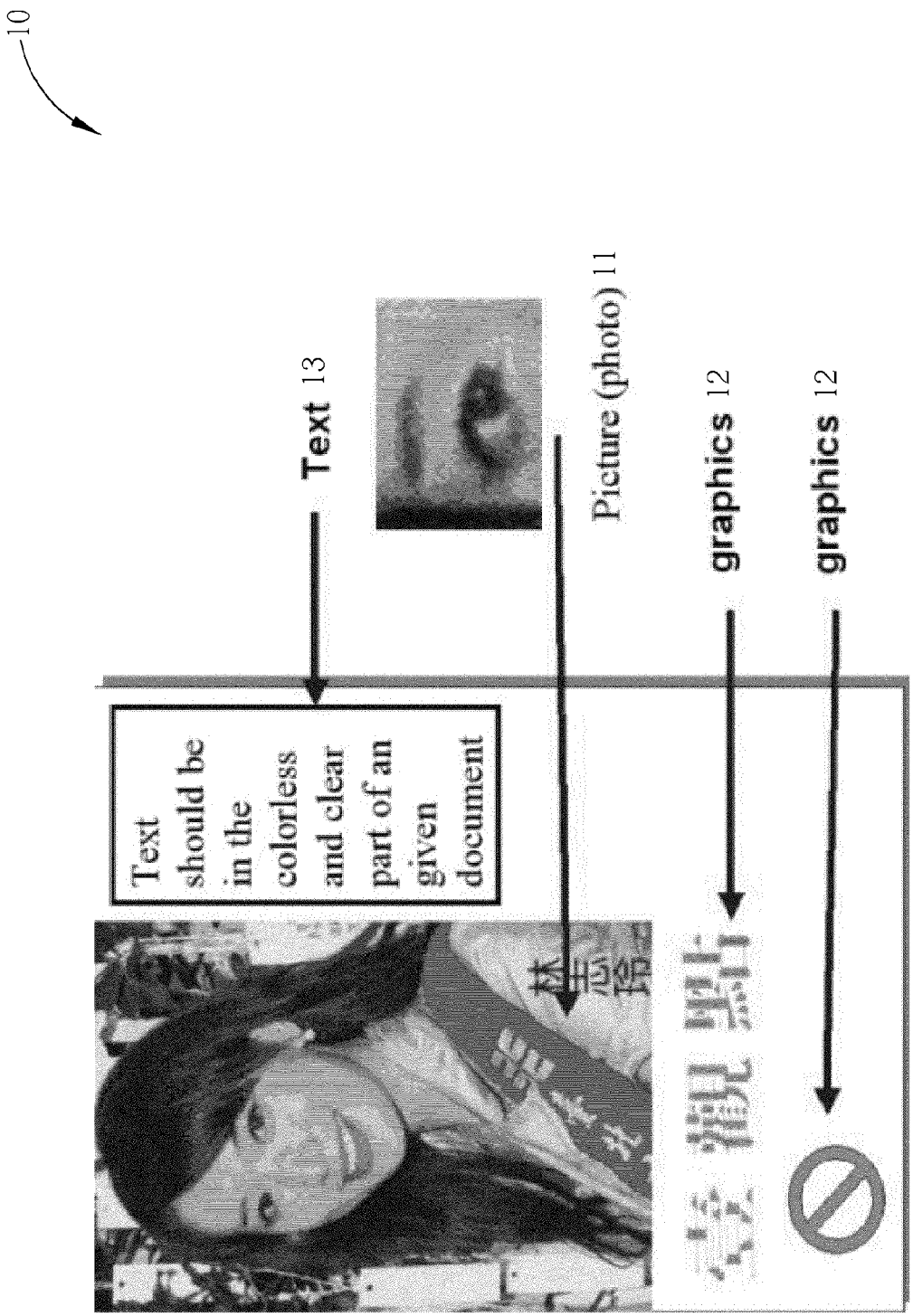
FIG. 1 shows a printed page generated through a digital image processing according to the prior art.
Figure 2:
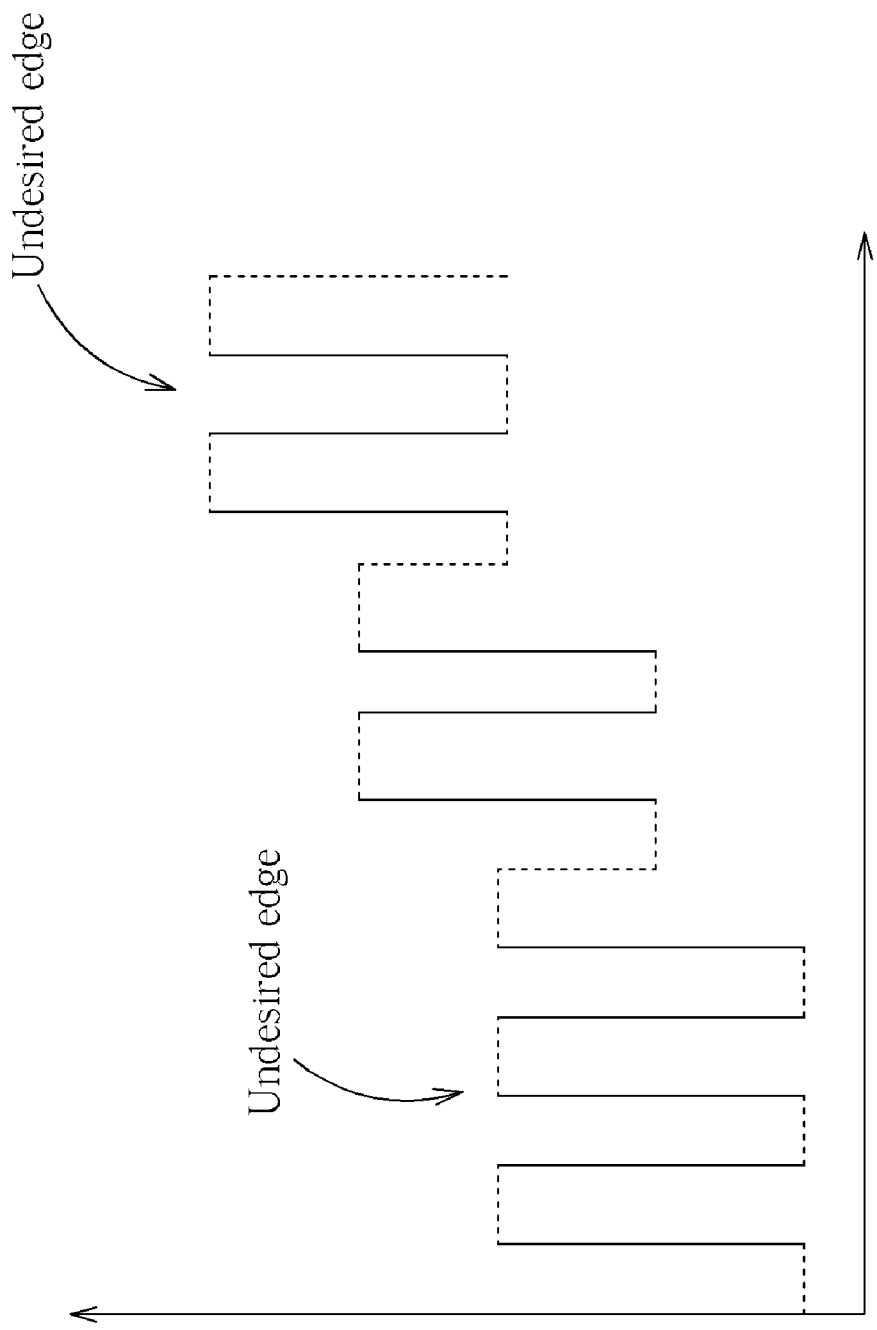
FIG. 2 is a drawing of the detection result according to the conventional edge detection method.
Figure 3:
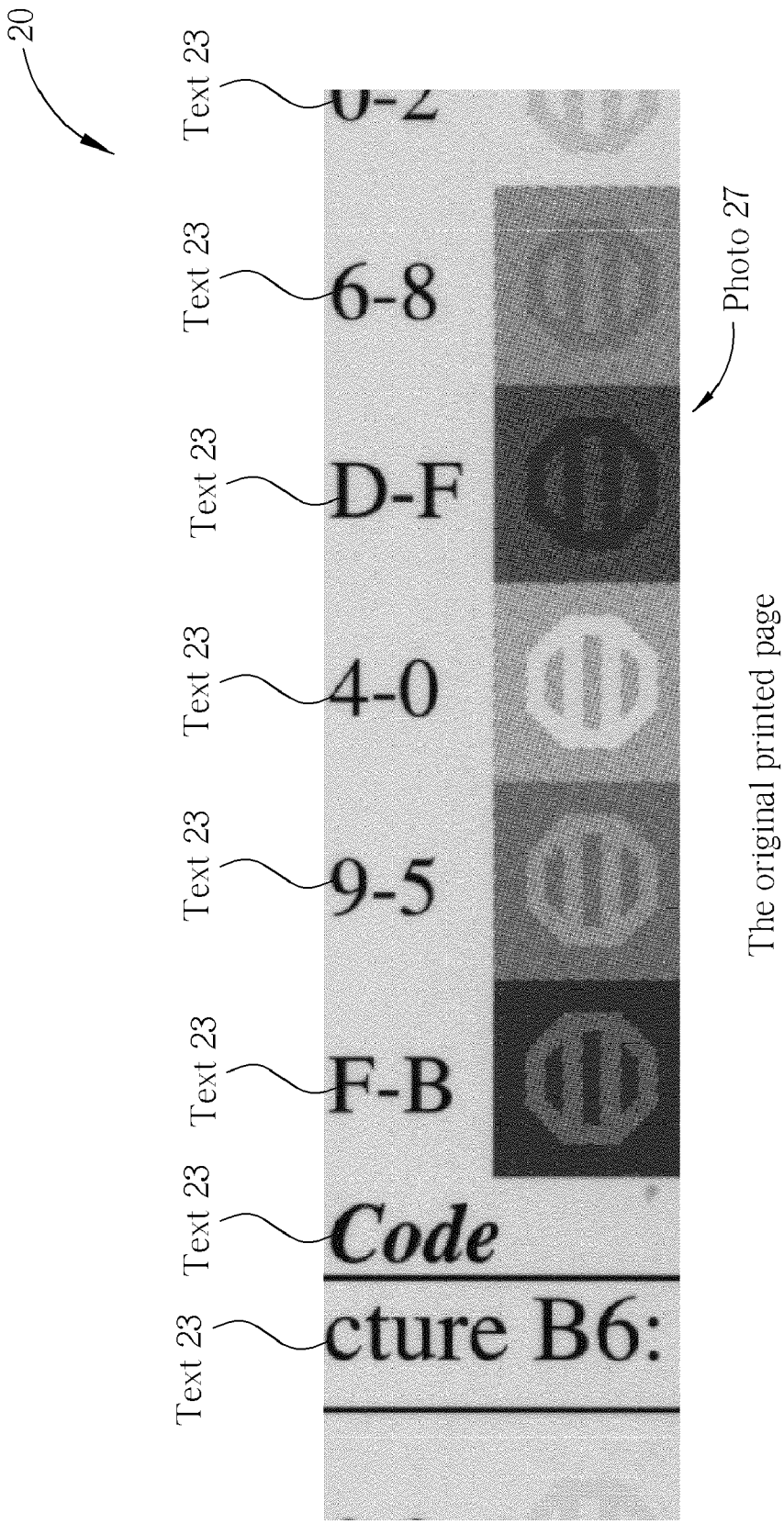
FIG. 3 is an original printed page.

The present invention discloses a method for generating a non-graphical digital image from an original digital image of a printed page to avoid the abovementioned defects in the prior art. Please refer to FIG. 3. FIG. 3 shows an original digital image of a printed page. FIG. 3 includes a printed page 20 containing a photo 27, and text 23. The present invention utilizes the luminance of a digital image to categorize the graphical regions, such as the photo 27, and non-graphical regions, such as the text 23, in the printed page 20. Therefore, first, a transformation from RGB to YCaCb should be performed on the pixels. The transformation matrix is listed below:

$$\begin{bmatrix} Y \\ Ca \\ Cb \end{bmatrix} = \begin{bmatrix} M11 & M12 & M13 \\ M21 & M22 & M23 \\ M31 & M32 & M33 \end{bmatrix} \begin{bmatrix} R \\ G \\ B \end{bmatrix}$$

Through a 3*3 transformation matrix, the mixed luminance and chrominance components in RGB pixels are separated into YCaCb components, wherein the luminance component is Y, and the chrominance components are Ca and Cb.

Figure 4:
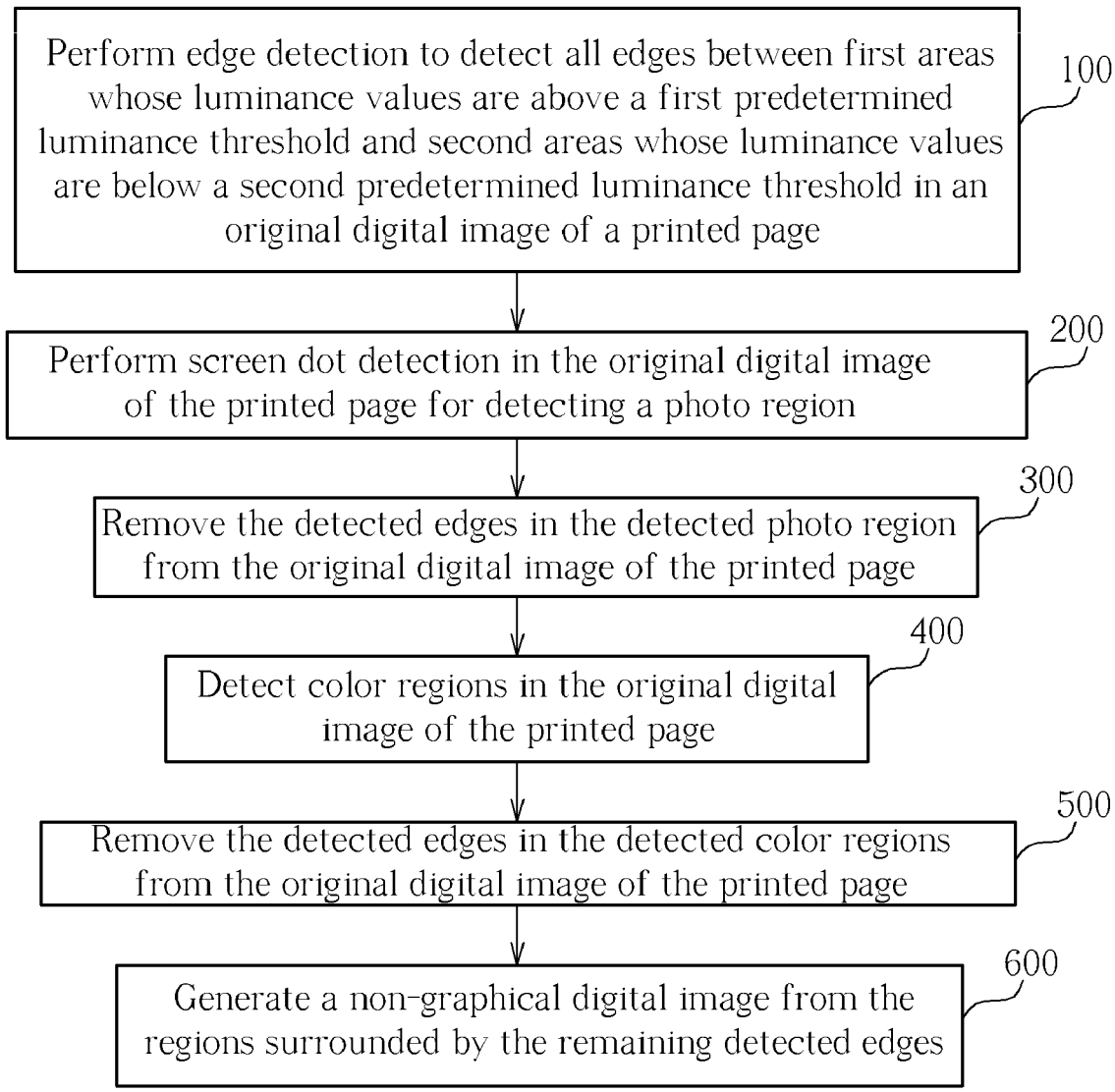
FIG. 4 is the overall flowchart of the method according to an embodiment of the present invention.

Please refer to FIG. 4. FIG. 4 is the overall flowchart of the method according to the present invention. The main steps of the method are listed below:

Step 100: perform edge detection to detect all edges between first areas whose luminance values are above a first predetermined luminance threshold and second areas whose luminance values are below a second predetermined luminance threshold in the original digital image of the printed page 20.

Step 200: perform screen dot detection in the original digital image of the printed page 20 for detecting a photo region 27.

Step 300: remove the detected edges in the detected photo region 27 from the original digital image of the printed page 20.

Step 400: detect color regions in the original digital image of the printed page 20.

Step 500: remove the detected edges in the detected color regions from the original digital image of the printed page 20.

Step 600: generate a non-graphical digital image from the regions surrounded by the remaining detected edges.

Detailed description of the above procedures is introduced as follows. First, the edge detection is performed to detect all the edges between first areas whose luminance values are above a first predetermined luminance threshold and second areas whose luminance values are below a second predetermined luminance threshold in the original digital image generated from the printed page 20. The first and second predetermined luminance thresholds are mainly decided according to the characteristics of the original digital image of the printed page 20, such as the difference between the maximum and the minimum luminance of the original digital image of the printed page 20. The edges derived from this step will contain more than the edges of the text 23. Next, perform screen dot detection in the original digital image for detecting the region of the photo 27. As aforementioned, a photo generated from an image-capturing device is rich in moiré formed by screen dots, therefore detecting the region(s) formed by screen dots can determine where the photo region 27 is in the printed page 20 correctly. Subsequently, remove the detected edges in step 100 in the detected photo region(s) from the original digital image. Then detect color region(s) in the original digital image and remove the detected edges in step 100 in the detected color region(s) from the original digital image to get rid of the unwanted edges because the text 23 is in neutral color (with no chrominance). Lastly, generate the non-graphical digital image from the regions surrounded by the remaining detected edges. The remaining edges are the edges of the text 23 (non-graphical regions) in the printed page 20. Please note that the result of each step is stored in a storage device of an executing system such as a CPU or a microcontroller, which is capable of performing the calculations and operations required in each step in FIG. 4; and moreover, provided that the result is substantially the same, the steps are not required to be executed in the exact order shown in FIG. 4, they can be executed simultaneously if the system has sufficient resources.

Figure 5:
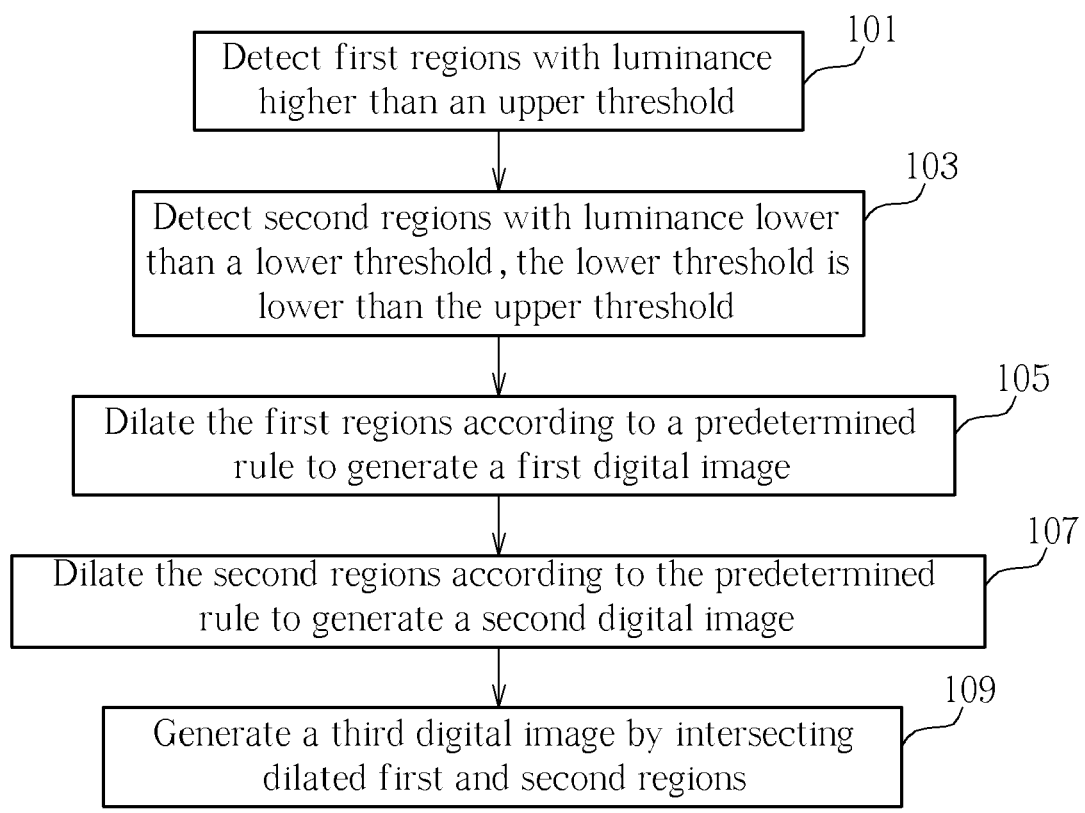
FIG. 5 is a more detailed flow chart of step 100 in FIG. 4.

Please refer to FIG. 5. FIG. 5 is a more detailed flow chart of step 100 in FIG. 4. The edge detection method in step 100 can be further detailed in the following steps:

Step 101: detect first regions with luminance higher than an upper threshold.

Step 103: detect second regions with luminance lower than a lower threshold; the lower threshold is lower than the upper threshold.

Step 105: dilate the first regions according to a predetermined rule to generate a first digital image.

Step 107: dilate the second regions according to the predetermined rule to generate a second digital image.

Step 109: generate a third digital image by intersecting dilated first and second regions.

Figure 6:
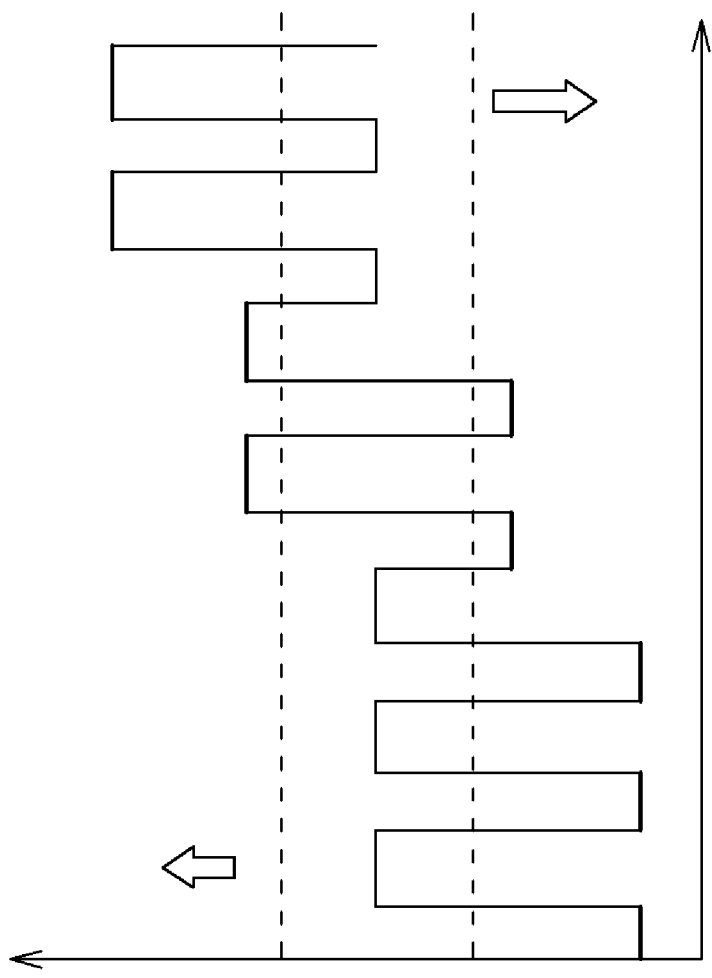
FIG. 6 is a drawing of the detected results according to steps 101 and 103 in FIG. 5.
Figure 7:
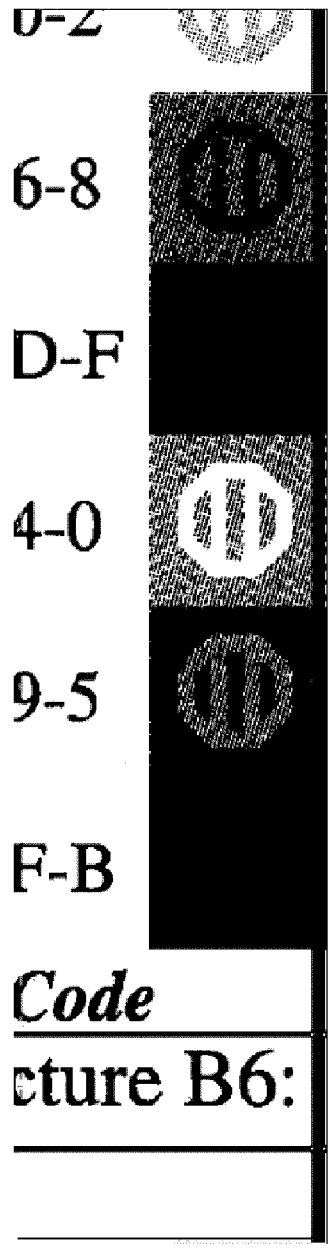
FIG. 7 is the first regions detected in FIG. 3.
Figure 8:
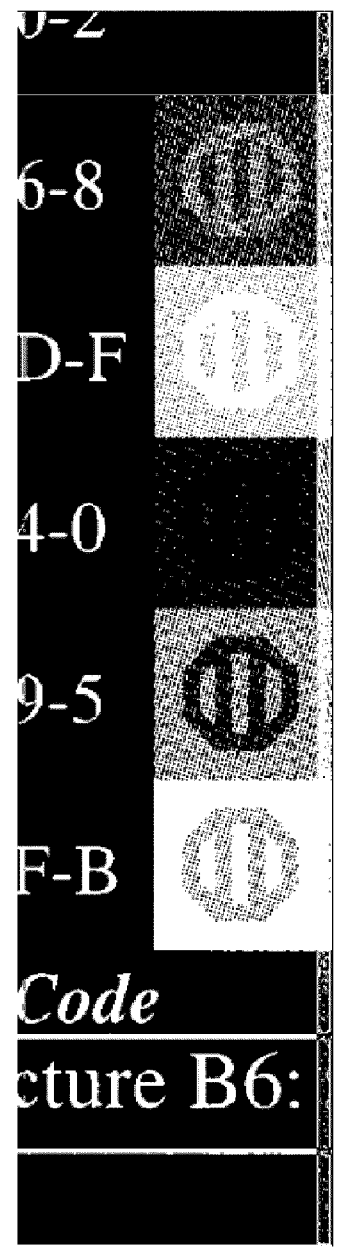
FIG. 8 is the second regions detected in FIG. 3.
Figure 11:
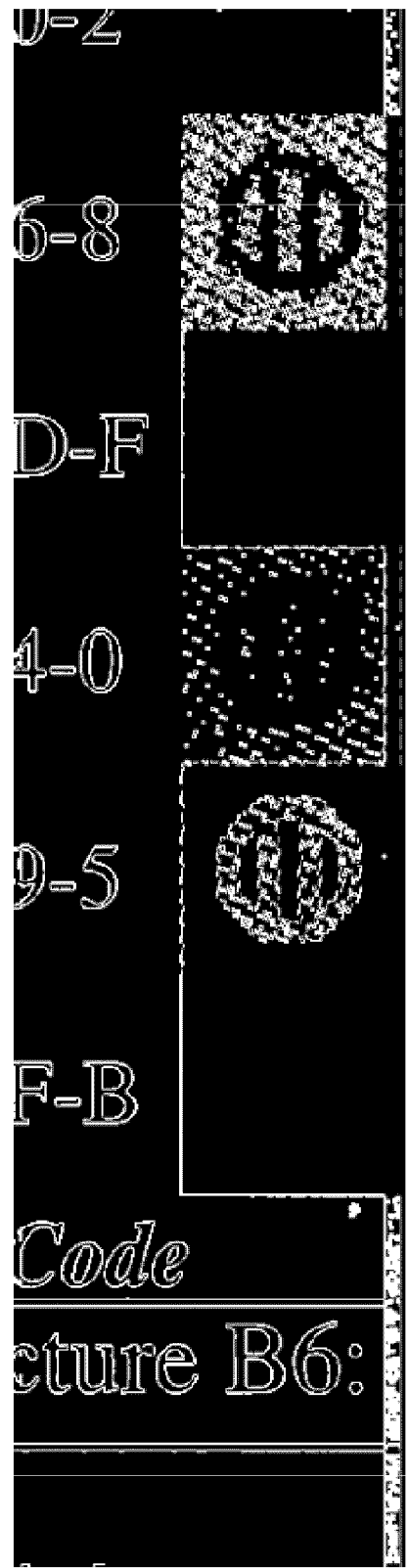
FIG. 11 is a third digital image including the intersection edges of FIG. 9 and FIG. 10.
Figure 12:
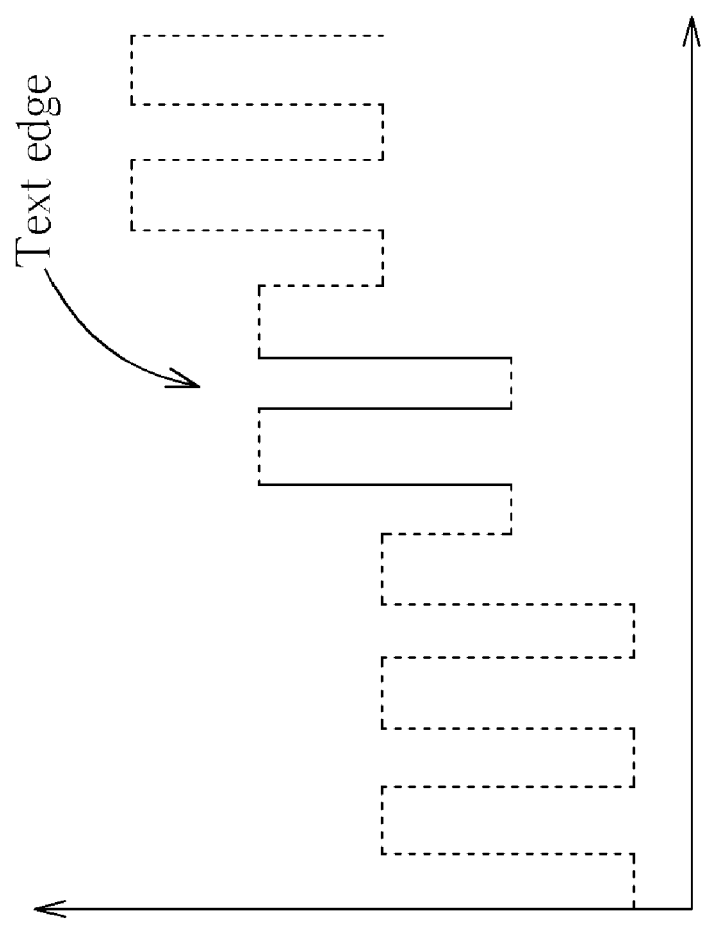
FIG. 12 is the intersection edges according to FIG. 6.
Figure 13:
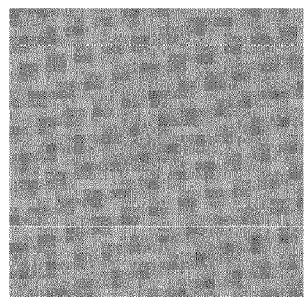
FIG. 13-20 are the normalized spectrum images of uniform patches of monochrome photos of 200 lpi.
Figure 14:
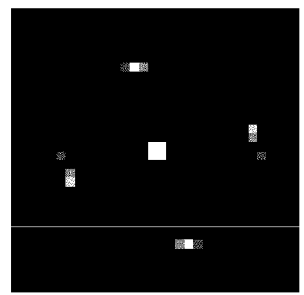
Figure 15:
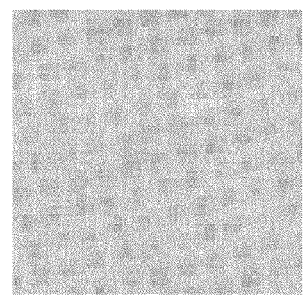
Figure 16:
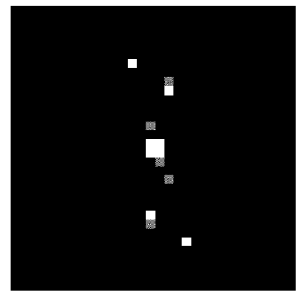
Figure 17:
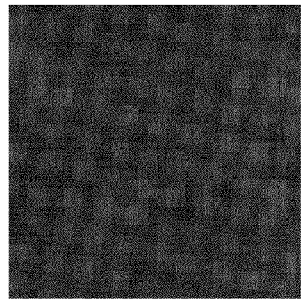
Figure 18:
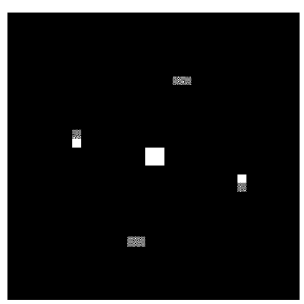
Figure 19:
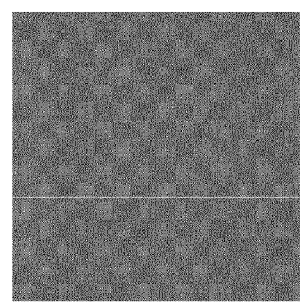
Figure 20:
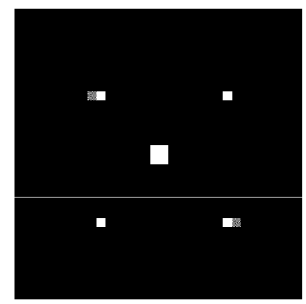
Figure 21:
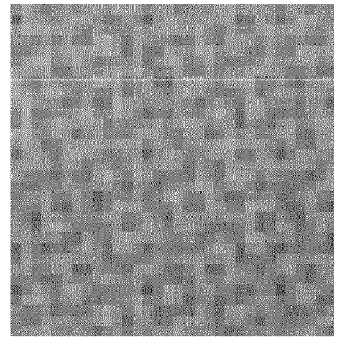
FIG. 21-24 are the spectrum images of multipass-color photos (with moiré structure) of 200 lpi.
Figure 22:
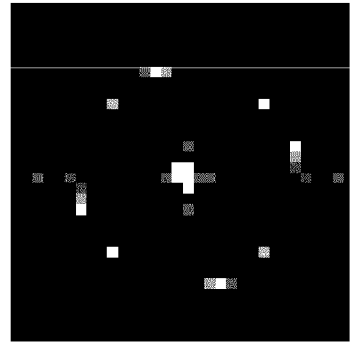
Figure 23:
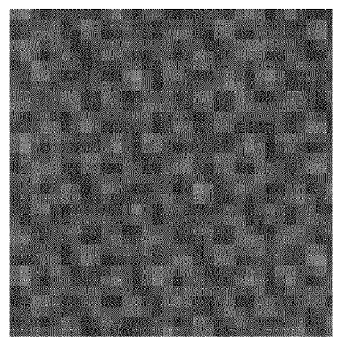
Figure 24:
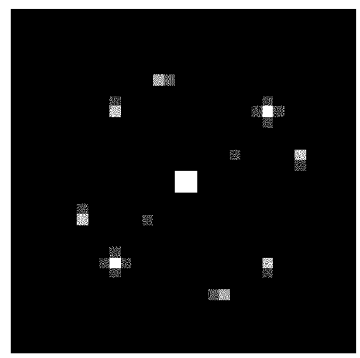

First, detect first regions with luminance higher than an upper threshold and second regions with luminance lower than a lower threshold, as shown in FIG. 6, instead of comparing the luminance of all regions, which the conventional art does and requires more resources and time. FIG. 6 is the drawing of the detected result according to steps 101 and 103 in FIG. 5. FIG. 7 is the first regions detected in FIG. 3. FIG. 8 is the second regions detected in FIG. 3. Secondly, dilate the first and second regions respectively by one to several pixels to generate a first digital image and a second digital image. Please refer to FIG. 9 and FIG. 10. FIG. 9 is a first digital image including the dilation result of FIG. 7; and FIG. 10 is a second digital image including the dilation result of FIG. 8. The extent of dilation depends on the characteristics of the original digital image in the printed page 20, such as the resolution or clearness of the original digital image. Lastly, generate a third digital image by intersecting dilated first and second regions and keep the third image in the storage device of the executing system. FIG. 11 is a third digital image including the intersection edges of FIG. 9 and FIG. 10. FIG. 12 is the intersection edges according to FIG. 6. Please note that provided that the result is substantially the same, the steps are not required to be executed in the exact order shown in FIG. 5.

Please refer to FIG. 13-24 together. FIG. 13-20 are the normalized spectrum images of uniform patches of monochrome photos of 200 lpi. FIG. 21-24 are the spectrum images of multipass-color photos (with moiré structure) of 200 lpi. From FIG. 13-24, we can see the screen lines formed by screen dots of different colors generate different angles corresponding to the center dot (the moiré structure) on the spectrum images, but have the same distance from the center dot (DC value); it is because the "lpi" for different colors are exactly the same.

Figure 25:
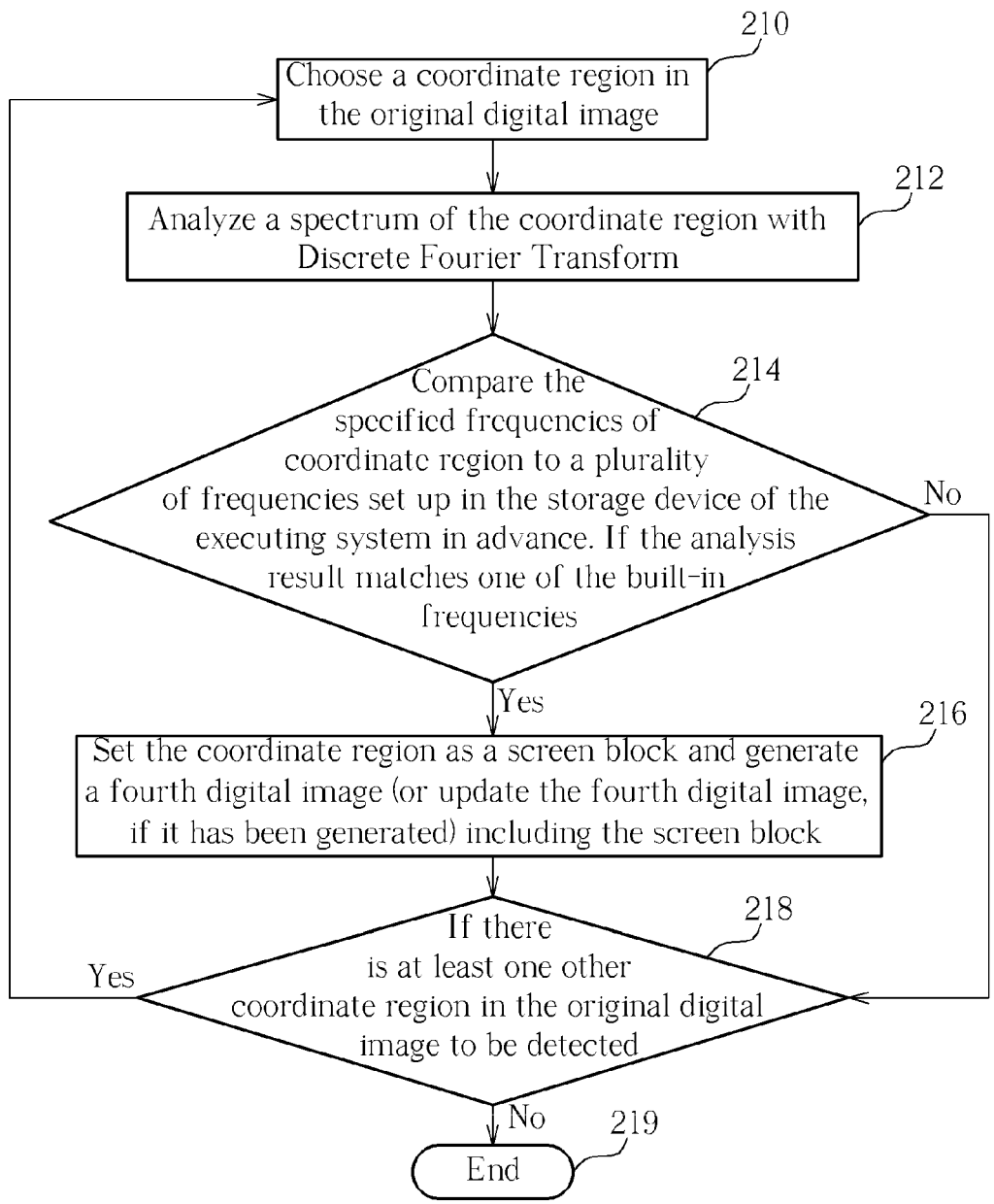
FIG. 25 is the flow chart of utilizing Discrete Fourier Transform to complete the screen dot detection.

After edge detection, as shown in step 200 in FIG. 4, the present invention raises two embodiments for performing the screen dot detection method to detect the region of the photo region 27 in the printed page 20. The first embodiment utilizes Discrete Fourier Transform to analyze the number of lines per inch within a coordinate region of a predetermined size in the original digital image of the printed page 20. The size of the coordinate region can be chosen according to the characteristics of the original digital image of the printed page 20, such as the resolution or clearness of the original digital image. Please refer to FIG. 25. FIG. 25 is the flow chart of utilizing Discrete Fourier Transform to complete the screen dot detection according to the first embodiment of the present invention. The steps of FIG. 25 can be interpreted in details as follows:

Step 210: choose a coordinate region in the original digital image.

Step 212: analyze a spectrum (frequency of the screen lines) of the coordinate region with Discrete Fourier Transform.

Step 214: compare the specified frequencies of coordinate region to a plurality of frequencies set up in the storage device of the executing system in advance. If the analysis result matches one of the built-in frequencies, then go to step 216; if not, go to step 218.

Step 216: set the coordinate region as a screen block and generate a fourth digital image (or update the fourth digital image, if it has been generated) including the screen block.

Step 218: determine if there is at least one other coordinate region in the original digital image to be detected. If so, go to step 210, if not, go to step 219.

Step 219: end.

First, choose a coordinate region in the original digital image generated from the printed page 20, and analyze the spectrum of the coordinate region with Discrete Fourier Transform. Then compare the analysis result to a plurality of frequencies stored in the storage device of the executing system in advance to determine whether the coordinate region is a screen block or not. If the spectrum exists a constant frequency in the coordinate region, and the constant frequency matches one of the built-in frequencies, then set the coordinate region as a screen block and generate a fourth digital image (or update the fourth digital image, if it has been generated) including the screen block. Moreover, the fourth digital image will be saved into the storage device of the executing system. The coordinate region is chosen from top to bottom, and from left to right in the original digital image until all the coordinate regions in the original digital image have been gone through once. The frequencies of uniform patches under various lpi (lines per inch) set up in the storage device in advance are the numbers of lines per inch commonly used in printing, such as 200 lpi, 150 lpi, or 85 lpi. A screen block means that each dot in the screen block belongs to screen dot. The equation of Discrete Fourier Transform used in the first embodiment is listed below:

$$F[u, v] = \frac{1}{MN} \sum_{x=0}^{M-1} \sum_{y=0}^{N-1} f[x, y] e^{[-j2\pi(\frac{ux}{M} + \frac{vy}{N})]}$$

wherein f [x,y] is the coordinate (x,y) of a pixel in the digital image of the printed page 20;

F[u,v] is the discrete Fourier transform of f [x,y];

M, N is the size of the analysis coordinate region.

Figure 26:
FIG. 26 is a fourth digital image of the result of screen dot detection according to FIG. 3 as derived from Discrete Fourier Transform.

Please refer to FIG. 26. FIG. 26 is the fourth digital image of the result of screen dot detection derived from Discrete Fourier Transform according to FIG. 3. Please note that the method of the present invention is only recommended to be applied in a photo region with single lpi setting, but not recommended to be applied in a photo with various lpi.

Figure 27:
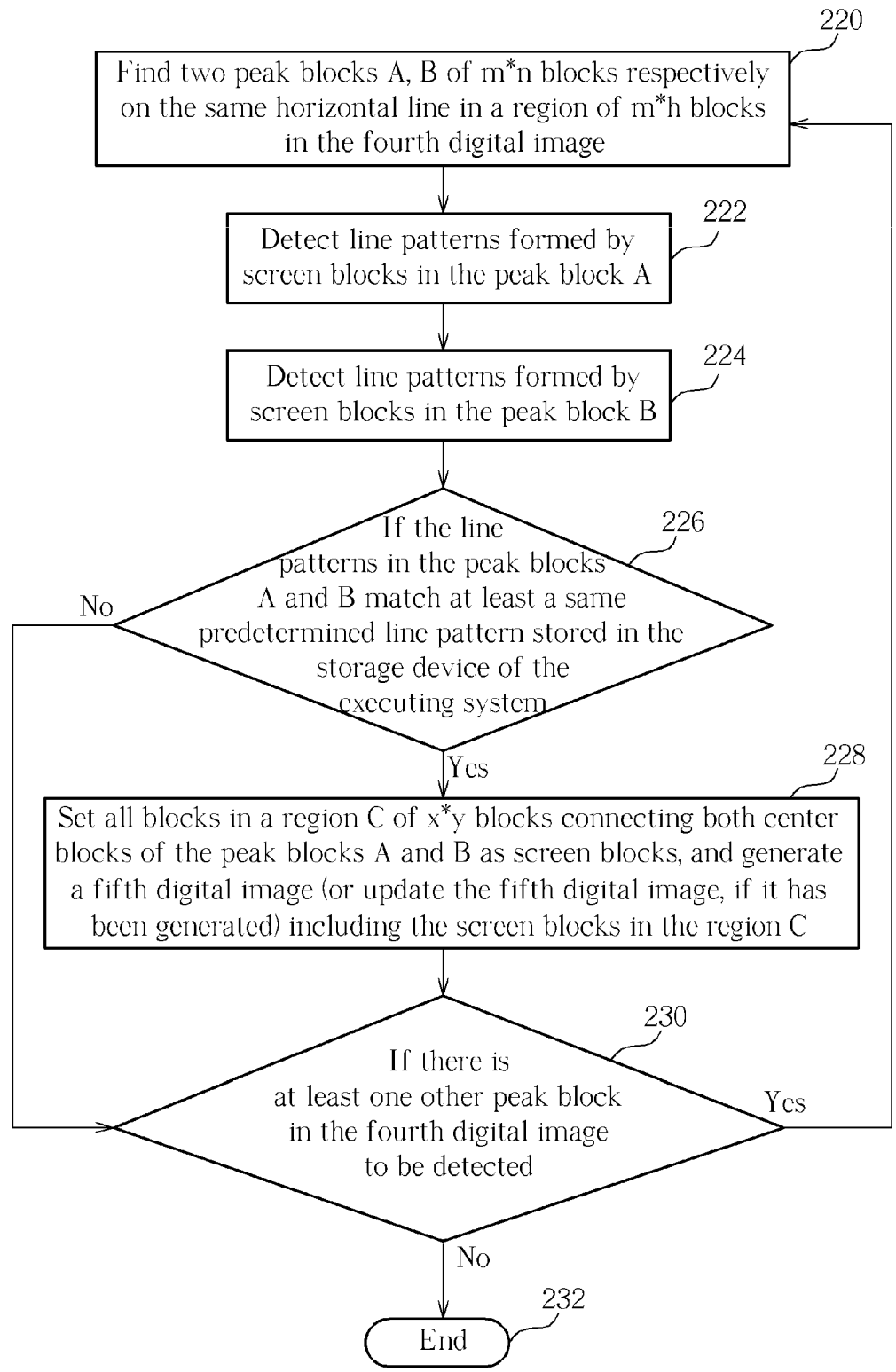
FIG. 27 is the detailed flowchart of the peak-block-connection step.

After Fourier Transform, a lot of screen blocks can be detected. However, since a photo region must be a complete region in the printed page 20, next, connect the detected and segmented screen blocks into a complete region in order to find the region of the photo region 27. The method of connecting the detected and segmented screen blocks into a complete region is called a peak-block-connection step. Please refer to FIG. 27. FIG. 27 is the detailed flowchart of the peak-block-connection step. A peak block is defined as a set of m*n blocks in the digital image. The steps of FIG. 27 can be further detailed as follows:

Step 220: find two peak blocks A, B of m*n blocks respectively on the same horizontal line in a region of m*h blocks in the fourth digital image.

Step 222: detect line patterns formed by screen blocks in the peak block A.

Step 224: detect line patterns formed by screen blocks in the peak block B.

Step 226: compare the line patterns formed by screen blocks found in peak blocks A and B, and if the line patterns in the peak blocks A and B match at least a same predetermined line pattern stored in the storage device of the executing system, then go to step 228; if not, go to step 230.

Step 228: set all blocks in a region C of x*y blocks connecting both center blocks of the peak blocks A and B as screen blocks and generate a fifth digital image (or update the fifth digital image, if it has been generated) including the screen blocks in the region C.

Step 230: determine if there is at least one other peak block in the fourth digital image to be detected. If so, go to step 220, if not, go to step 232.

Step 232: end.

Figure 28:
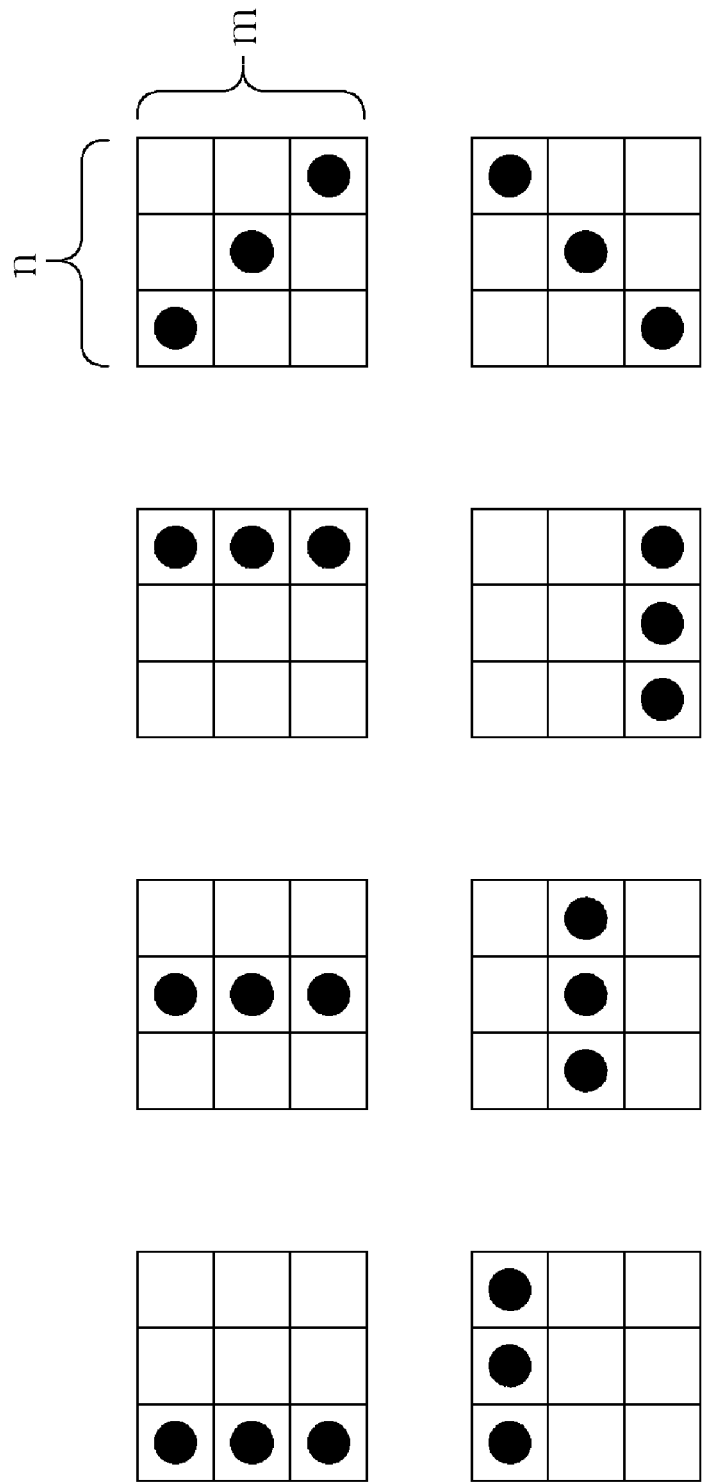
FIG. 28 is a drawing of a predetermined line pattern stored in the storage device of the executing system.
Figure 29:
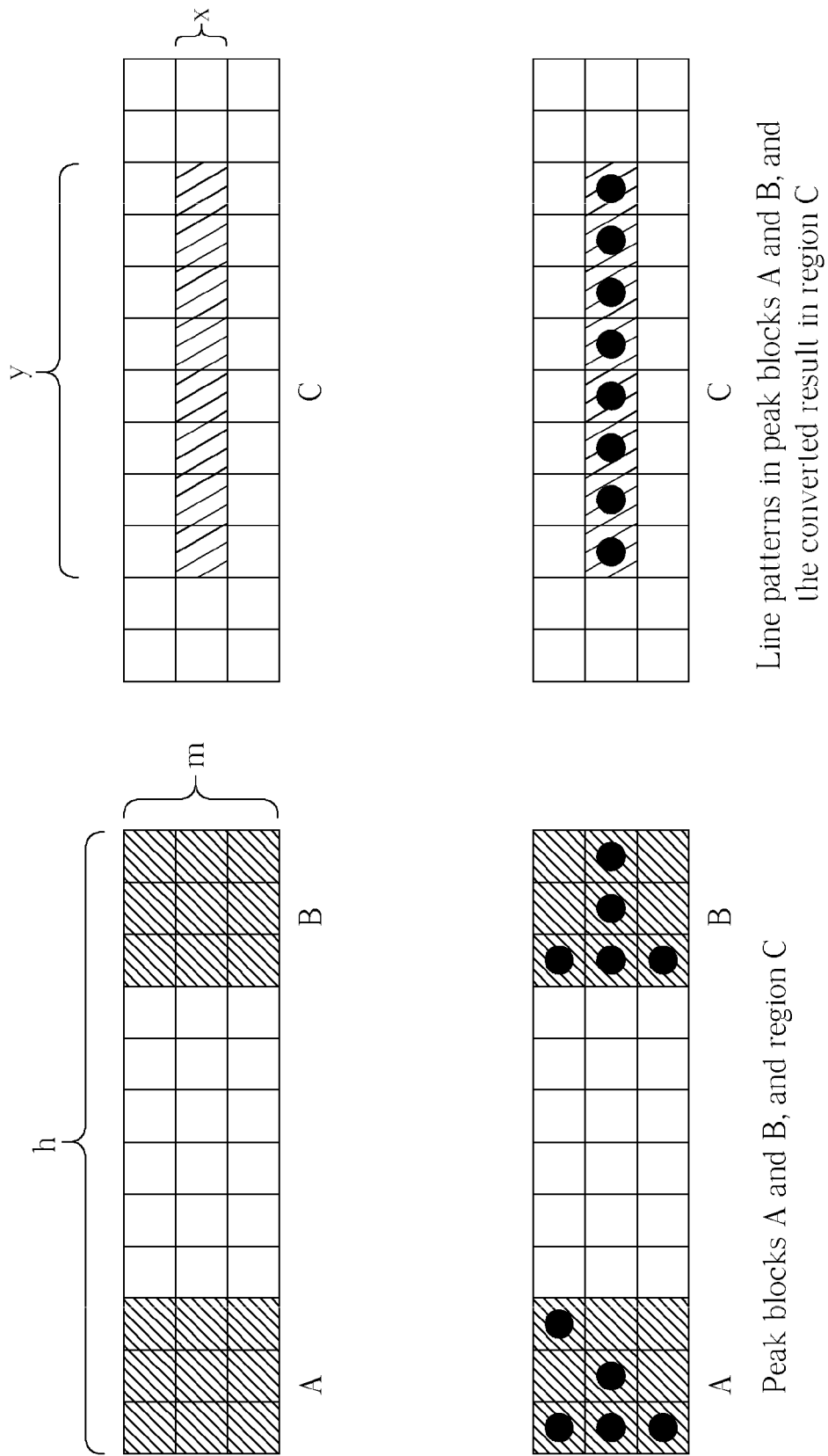
FIG. 29 includes drawings of peak blocks A and B, and region C, and drawings of line patterns in peak blocks A and B, and the converted result in region C according to the first embodiment of the present invention.
Figure 30:
FIG. 30 is a fifth digital image of the result derived from the peak-block-connection step according to FIG. 3.

According to the above-mentioned steps, first, define the region of m*n blocks as a peak block. Then compare the distribution of line patterns of the screen blocks found in two peak blocks A and B, located on a same horizontal line in the fourth digital image within a range of m*h blocks, wherein n<h. If the distributions of line patterns of the screen blocks in the peak blocks A and B match at least one similar predetermined line pattern stored in the storage device of the executing system beforehand, set all blocks in a region C of x*y blocks, connecting both center blocks of the peak blocks A and B, as screen blocks, and generate a fifth digital image (or update the fifth digital image, if it has been generated) including the screen blocks in the region C. Wherein m, n, h, x, y are arbitrary positive integers chosen according to the characteristics of the image, such as the size, clearness, or resolution. The region of m*h blocks is chosen from top to bottom, and from left to right in the fourth digital image, until the fourth digital image has been gone through once. Please refer to FIG. 28. FIG. 28 is a drawing of predetermined line patterns stored in the storage device of the executing system. Please note that vertical blocks x in a column of the region C (blocks x*y) must be smaller than vertical blocks m in a column of the peak block (blocks m*n) by at least one block at the top and one block at the bottom respectively. Moreover, the fifth digital image will be saved into the storage device of the executing system. Please refer to FIG. 29 and FIG. 30. FIG. 29 includes drawings of the peak blocks A, B and the region C, and drawings of line patterns in peak blocks A and B, and the set result in the region C. FIG. 30 is the fifth digital image of the result derived from the peak-block-connection step according to FIG. 3. Please note that provided that the result is substantially the same, the steps are not required to be executed in the exact order shown in FIG. 27.

Figure 31:
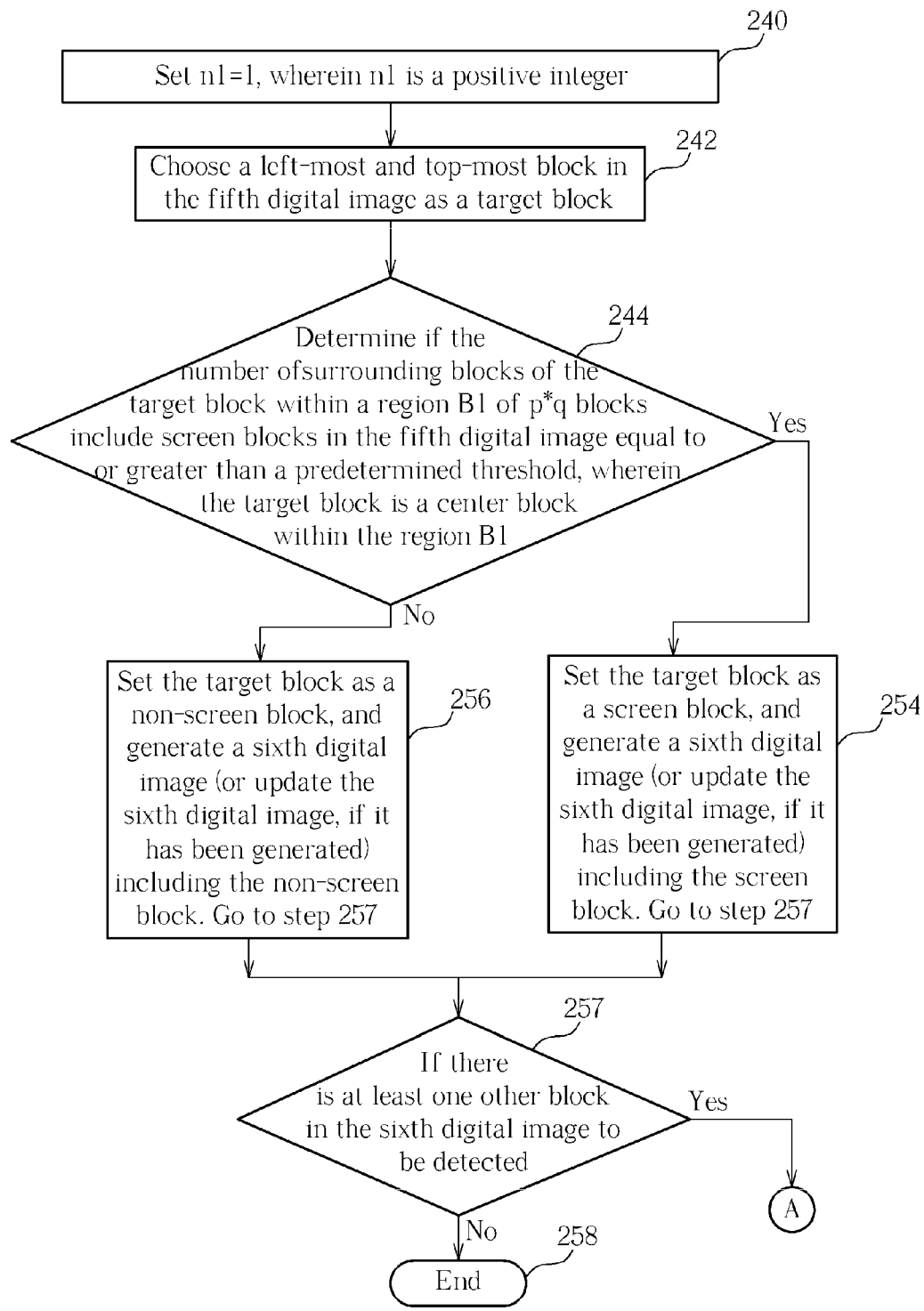
FIG. 31 and FIG. 32 are the detailed flowcharts of removing blocks chosen incorrectly according to the first embodiment of the present invention.
Figure 32:
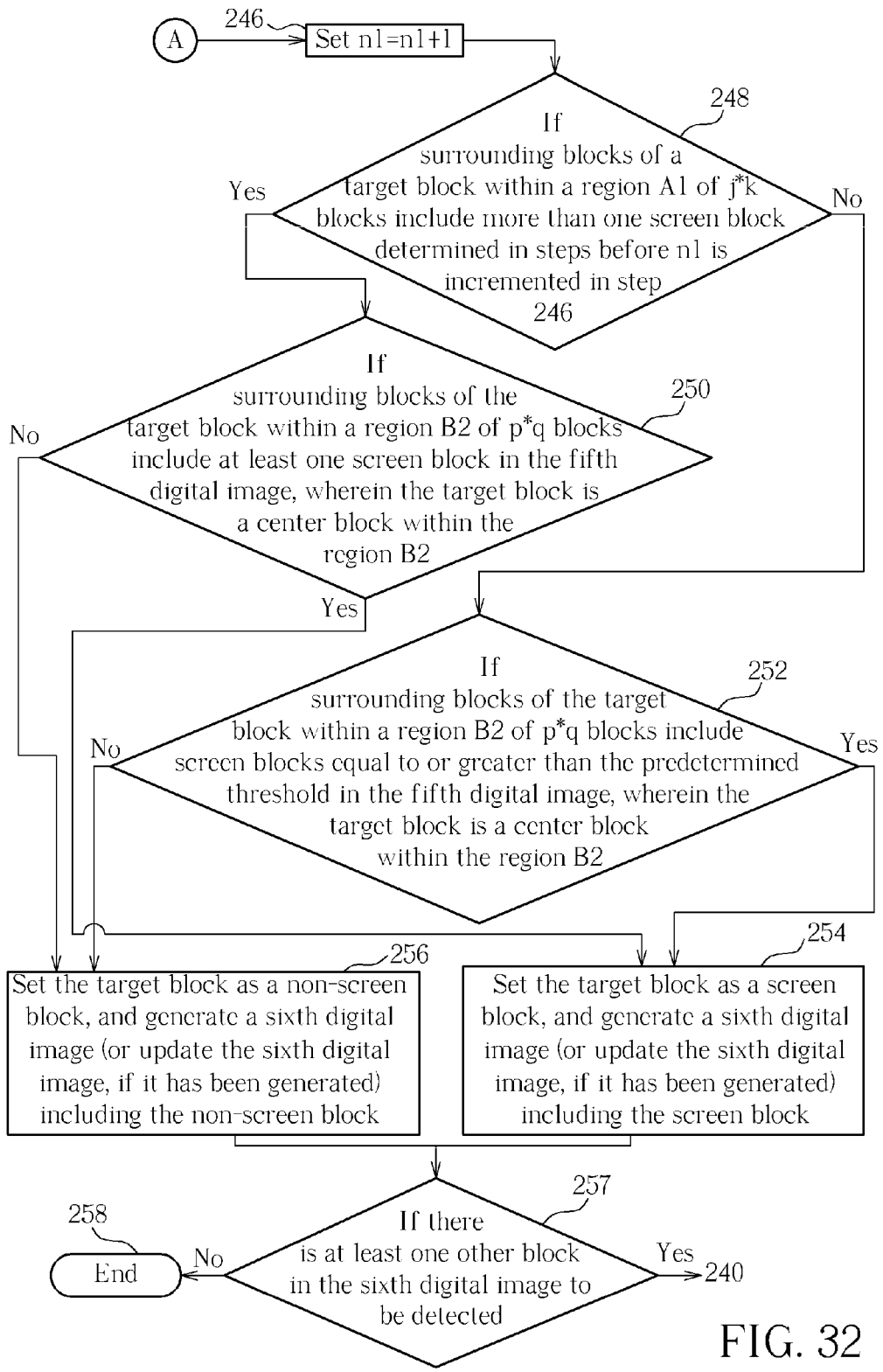

After performing the peak-block-connection step to find a complete region of the photo, a next step is removing the blocks chosen incorrectly. The theory of this step is similar to Dilation and Erosion, determining whether a block within a predetermined region of blocks is a screen block according to an attribute of surrounding blocks of the block. Please refer to FIG. 31 and FIG. 32. FIG. 31 and FIG. 32 are the detailed flowcharts of removing the blocks chosen incorrectly. The steps of FIG. 31 and FIG. 32 can be further detailed as follows:

Step 240: set n1=1, wherein n1 is a positive integer.

Step 242: choose a left-most and top-most block in the fifth digital image as a target block.

Step 244: determine if the number of surrounding blocks of the target block within a region B1 of p*q blocks include screen blocks in the fifth digital image equal to or greater than a predetermined threshold, wherein the target block is a center block within the region B1. If so, go to step 254, if not, go to step 256.

Step 246: set n1=n1+1.

Step 248: determine if surrounding blocks of a target block within a region A1 of j*k blocks in the sixth digital image include more than one screen block determined in steps before n1 is incremented in step 246. If so, go to step 250, if not, go to step 252.

Step 250: determine if surrounding blocks of the target block within a region B2 of p*q blocks include at least one screen block in the fifth digital image, wherein the target block is a center block within the region B2. If so, go to step 254, if not, go to step 256.

Step 252: determine if surrounding blocks of the target block within a region B2 of p*q blocks include screen blocks equal to or greater than the predetermined threshold in the fifth digital image, wherein the target block is a center block within the region B2. If so, go to step 254, if not, go to step 256.

Step 254: set the target block as a screen block, and generate a sixth digital image (or update the sixth digital image, if it has been generated) including the screen block. Go to step 257.

Step 256: set the target block as a non-screen block, and generate a sixth digital image (or update the sixth digital image, if it has been generated) including the non-screen block. Go to step 257.

Step 257: determine if there is at least one other block in the sixth digital image to be detected. If so, go to step 246, if not, go to step 258.

Step 258: end.

The step of removing the blocks chosen incorrectly is performed by setting a left-most and top-most target block in the fifth digital image as a screen block or a non-screen block and generating a sixth digital image according to a number of screen blocks besides the left-most and top-most target block within the region B1 of p*q blocks in the fifth digital image, wherein the left-most and top-most target block is a center block of the region B1; and setting a target block within the region A1 of j*k blocks in the sixth digital image as a screen block or a non-screen block and updating the sixth digital image according to a number of screen blocks besides the target block within the region A1 of j*k blocks in the sixth digital image, and a number of screen blocks besides the target block within the region B2 of p*q blocks in the fifth digital image, wherein the target block is a center block of the region B2 of p*q blocks, and j, k, p, q are arbitrary positive integers chosen according to the characteristics of the image, such as the size, clearness, or resolution. The target blocks besides the left-most and top-most target block are chosen from top to bottom, and from left to right in the sixth digital image until the sixth digital image has been gone through once, and the left-most and top-most target block is chosen in the fifth digital image. Determining whether the target block is a screen block or a non-screen block can be categorized into several conditions:

1. If the target block is the left-most and top-most target block chosen in the fifth digital image:

Condition I: If the number of surrounding blocks of the target block within the region B1 in the fifth digital image include screen blocks equal to or greater than a predetermined threshold, determine that the target block is a screen block and generate a sixth digital image including the target block.

Condition II: If the number of surrounding blocks of the target block within the region B1 in the fifth digital image include screen blocks less than a predetermined threshold, determine that the target block is not a screen block and generate a sixth digital image including the target block.

2. If the target block is not the left-most and top-most block and is chosen in the sixth digital image:

Condition III: If less than two surrounding blocks of the target block within a region A are screen blocks in the sixth digital image, and more than a predetermined threshold of the screen blocks were found in the fifth digital image within a region B2, determine the target block is a screen block and updating the sixth digital image; wherein the target block is a center block of the region B2.

Condition IV: If more than one surrounding block of the target block within a region A is a screen block in the sixth digital image, and equal to or greater than one screen block was found in the fifth digital image within a region B2, determine the target block is a screen block and update the sixth digital image; wherein the target block is a center block of the region B2.

Condition V: If less than two surrounding blocks of the target block within a region A are screen blocks in the sixth digital image, and less than a predetermined threshold of the screen blocks were found in the fifth digital image within a region B2, determine that the target block is not a screen block and update the sixth digital image; wherein the target block is a center block of the region B2.

Condition VI: If more than one surrounding block of the target block within a region A is a screen block in the sixth digital image, and less than two screen blocks were found in the fifth digital image within a region B2, determine that the target block is not a screen block and update the sixth digital image; wherein the target block is a center block of the region B2.

Figure 33:
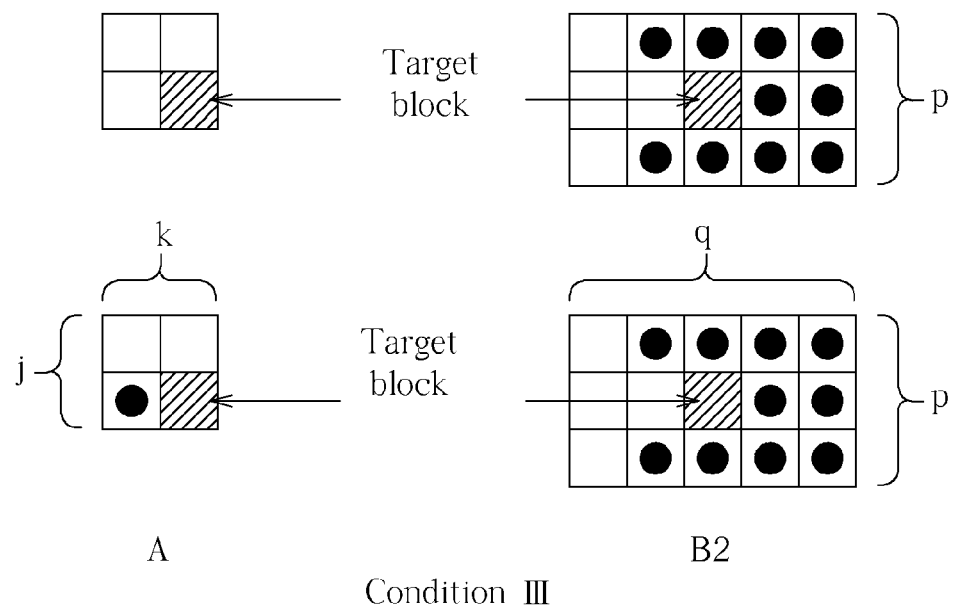
FIG. 33 is a drawing of Condition III of removing the blocks chosen incorrectly.
Figure 34:
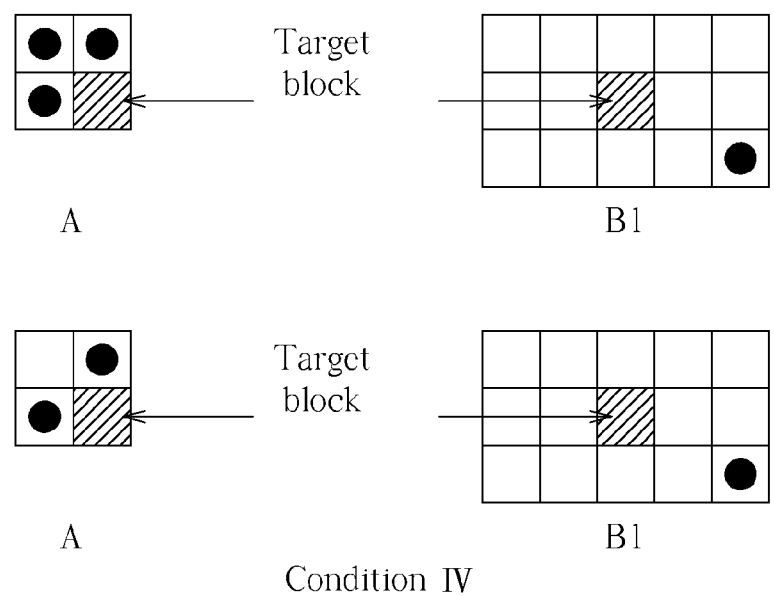
FIG. 34 is a drawing of Condition IV of removing the blocks chosen incorrectly.
Figure 35:
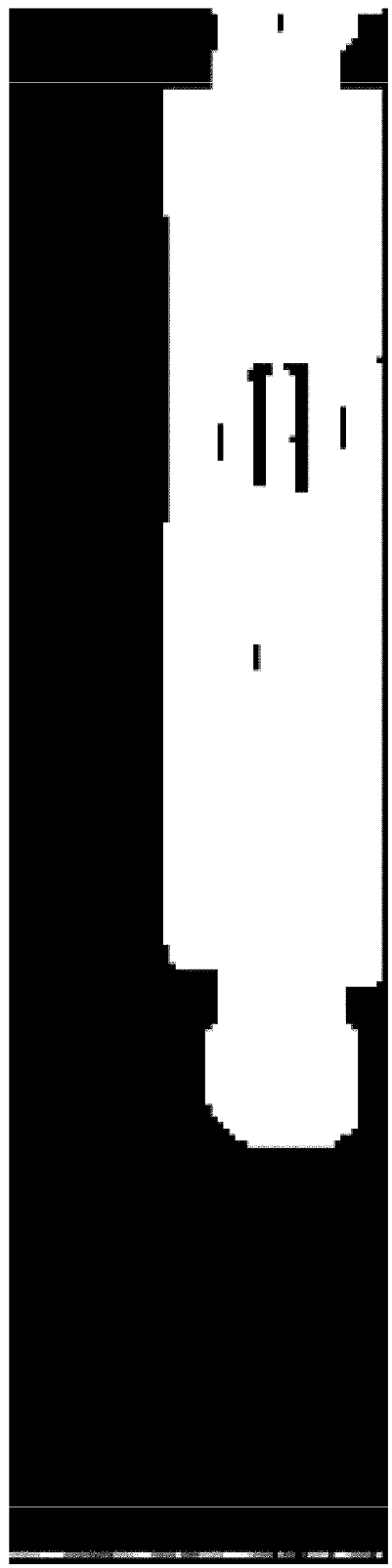
FIG. 35 is a sixth digital image of the result of removing the blocks chosen incorrectly according to FIG. 3.

Please refer to FIG. 33, FIG. 34, and FIG. 35 in all. FIG. 33 is a drawing of Condition III and FIG. 34 is a drawing of Condition IV according to the present invention. FIG. 35 is a sixth digital image of the result of removing the blocks chosen incorrectly according to FIG. 3. Please note that the region A of j*k blocks must be smaller than the region B1 of p*q blocks, and the target block can't be the left-most and topmost block within the region A. That is the target block in the region A should be chosen at least from the second column and second row at the beginning of this step. Provided that the result is substantially the same, the steps are not required to be executed in the exact order shown in FIG. 31 and FIG. 32.

Figure 36:
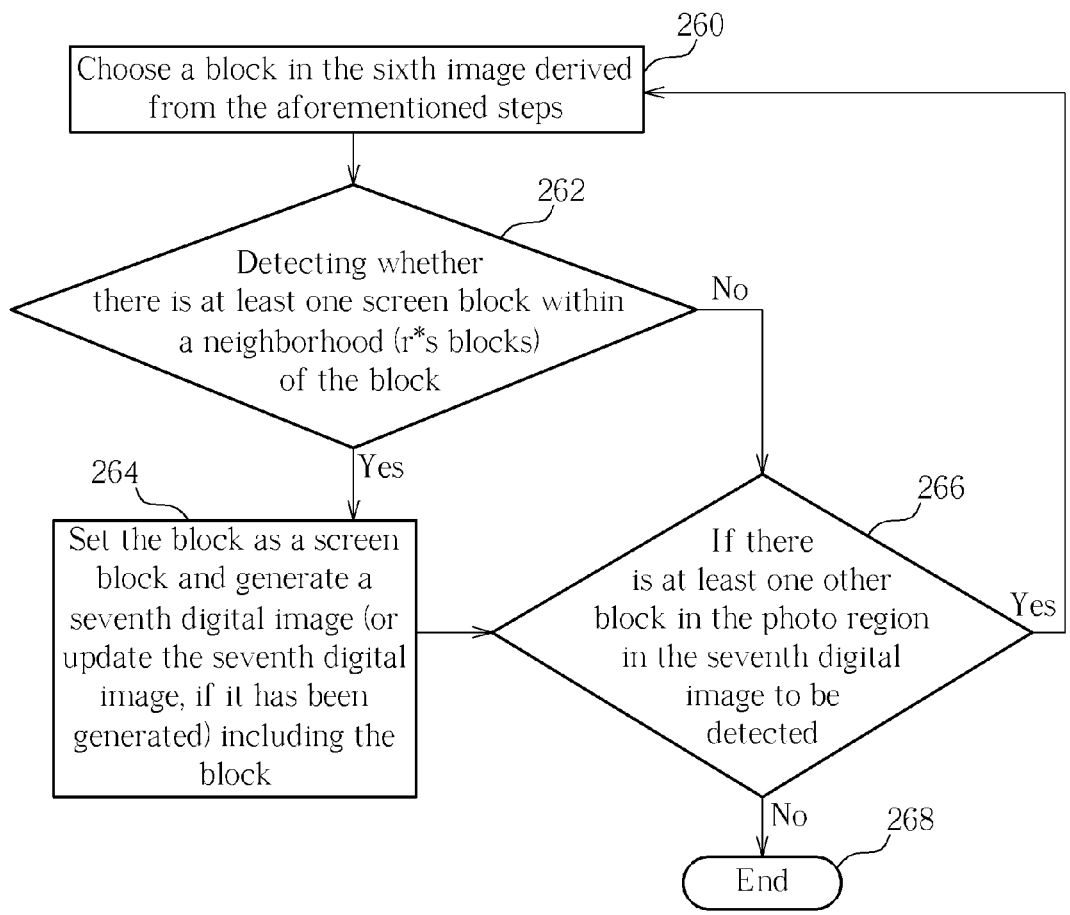
FIG. 36 is the detailed flowchart of expanding the detected region of the photo according to the first embodiment of the present invention.

The last calibration step of screen dot detection is expanding the detected region of the photo. Sometimes after all the aforementioned steps, the detected region can't completely cover the photo region, especially the edges of the photo region 27. Therefore, expand the detected region derived from the aforementioned steps in order to cover the edges of the photo region 27 is the last step of the screen dot detection procedure according to the present invention. Please refer to FIG. 36. FIG. 36 is the detailed flowchart of expanding the detected region of the photo according to the first embodiment of the present invention. The steps of FIG. 36 can be further detailed as follows:

Step 260: choose a block in the sixth image derived from the aforementioned steps.

Step 262: detect whether there is at least one screen block within a neighborhood (r*s blocks) of the block. If so, go to step 264, if not, go to step 266.

Step 264: set the block as a screen block and generate a seventh digital image (or update the seventh digital image, if it has been generated) including the block, then go to step 266.

Step 266: determine if there is at least one other block to be detected in the photo region in the seventh digital image. If so, go to step 260, if not, go to step 268.

Step 268: end.

Figure 37:
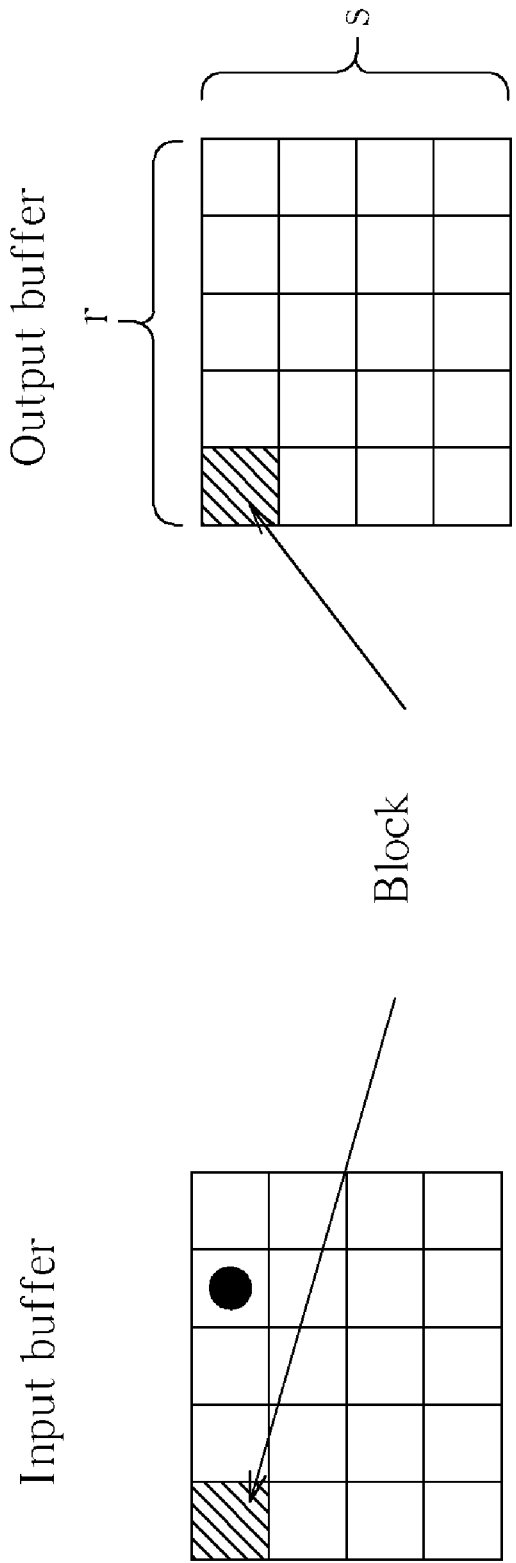
FIG. 37 includes a drawing of a block in a detected region including a screen block and a drawing of outputting the block as a screen block.
Figure 38:
FIG. 38 is a seventh digital image of the result of expanding the detected region of the photo according to FIG. 3.

Expanding the detected region of the photo derived from the aforementioned steps is also based on the attributes of neighboring blocks of a block. If at least one screen block is detected in the neighborhood (r*s blocks) of the block, set the block as a screen block and generate a seventh digital image (or update the seventh digital image, if it has been generated) including the block. The block is chosen from top to bottom, and from left to right in the sixth digital image until the whole sixth digital image has been gone through once. Please refer to FIG. 37 and FIG. 38. FIG. 37 includes a drawing of a block in a detected region including a screen block, and a drawing of outputting the block as a screen block. FIG. 38 is a seventh digital image of the result of expanding the detected region of the photo according to FIG. 3. Please note that in this last calibration step, it is not necessary for the block to be a center block in the neighborhood of r*s blocks, wherein r, s are arbitrary positive integers chosen according to the characteristics of the image, such as the size, clearness, or resolution. Provided that the result is substantially the same, the steps are not required to be executed in the exact order shown in FIG. 36.

Figure 39:
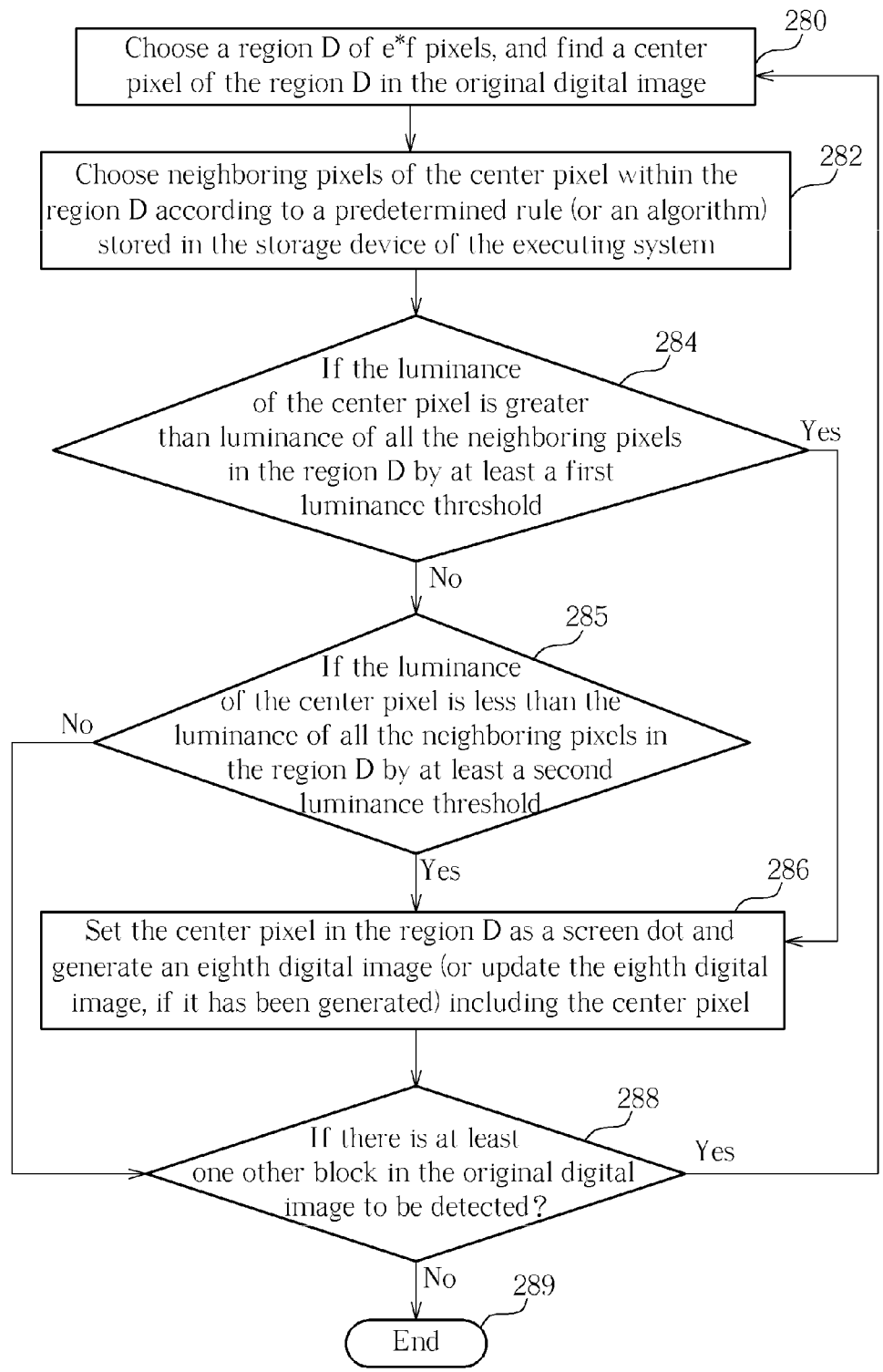
FIG. 39 is the detailed flowchart of peak/valley detection according to the second embodiment of the present invention.

The above-mentioned is the method of screen dot detection utilizing Discrete Fourier Transform, the present invention further releases a second embodiment utilizing a peak/valley detection method to replace Discrete Fourier Transform. Please refer to FIG. 39. FIG. 39 is the detailed flowchart of peak/valley detection according to the second embodiment of the present invention. The steps of FIG. 39 can be further detailed as follows:

Step 280: choose a region D of e*f pixels, and find a center pixel of the region D in the original digital image.

Step 282: choose neighboring pixels of the center pixel within the region D according to a predetermined rule (or an algorithm) stored in the storage device of the executing system.

Step 284: compare luminance of the center pixel with all neighboring pixels in the region D. If the luminance of the center pixel is greater than luminance of all the neighboring pixels in the region D by at least a first luminance threshold, then go to step 286, if not, then go to step 285.

Step 285: determine if the luminance of the center pixel is less than the luminance of all the neighboring pixels in the region D by at least a second luminance threshold, then go to step 286, if not, then go to step 288.

Step 286: set the center pixel in the region D as a screen dot and generate an eighth digital image (or update the eighth digital image, if it has been generated) including the center pixel.

Step 288: determine if there is at least one other block in the original digital image to be detected. If so, go to step 280, if not, go to step 289.

Step 289: end.

Figure 41:
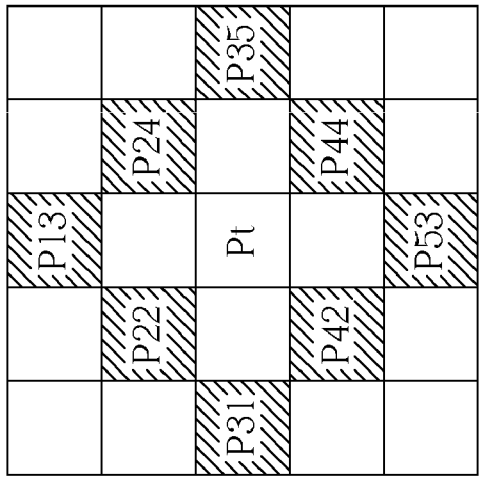
FIG. 41 is an exemplary drawing of choosing neighboring pixels when the number of lines per inch is greater according to the second embodiment of the present invention.
Figure 40:
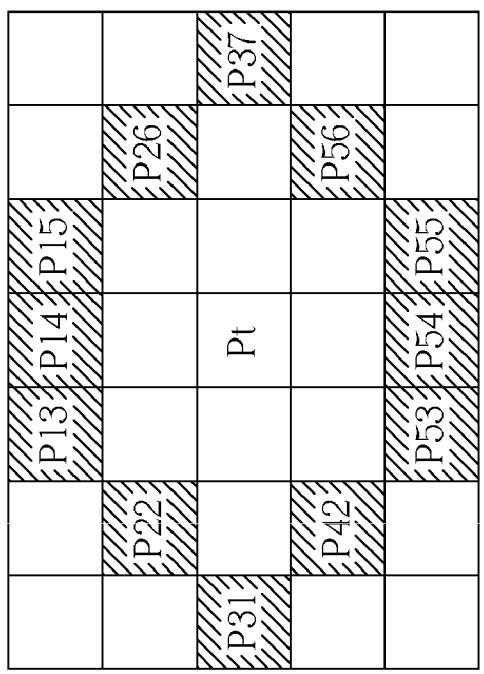
FIG. 40 is an exemplary drawing of choosing neighboring pixels when the number of lines per inch is less according to the second embodiment of the present invention.

The step is performed by setting a center pixel of a region D of e*f pixels as a screen dot according to luminance differences between the center pixel and neighboring pixels within the region D of e*f pixels chosen according to a predetermined rule stored in the storage device of the executing system in advance. First, choose a detected region D of e*f pixels in the original digital image, wherein e, f are arbitrary positive integers chosen according to the characteristics of the image, such as the size, or clearness. The detected region D is chosen from top to bottom, and from left to right in the original digital image until the whole original image has been gone through once. Compare luminance of the center pixel in the region D with luminance of the neighboring pixels chosen according to a predetermined rule or an algorithm stored in the storage device of the executing system. The rule or the algorithm is determined according to the number of lines per inch in the photo region 27. The number of lines per inch in the photo region 27 is compared with several numbers of lines per inch commonly-used in printing, and stored in the storage device of the executing system in advance. If the number of lines per inch is less, it means that the screen dots are bigger, then the neighboring pixels should be chosen further from the center pixel, please refer to FIG. 40. FIG. 40 is an exemplary drawing of choosing neighboring pixels when the number of lines per inch is less. On the contrary, if the number of lines per inch is greater, it means the screen dots are more condensed, then the neighboring pixels should be chosen closer to the center pixel, please refer to FIG. 41. FIG. 41 is an exemplary drawing of choosing neighboring pixels when the number of lines per inch is greater. Subsequently, according to the compared result, if the luminance of the center pixel is more than the luminance of the neighboring pixels within the region D by equal to or more than a predetermined first luminance threshold, then determine the center pixel in the region D is a screen dot and generate an eighth digital image (or update the eighth digital image, if it has been generated) including the center pixel. This is the peak detection. If the luminance of the center pixel is less than the luminance of the neighboring pixels within the region D by equal to or less than a predetermined second luminance threshold, then determine the center pixel in the region D is a screen dot and generate an eighth digital image (or update the eighth digital image, if it has been generated) including the center pixel. This is the valley detection. Please note that provided that the result is substantially the same, the steps are not required to be executed in the exact order shown in FIG. 39.

Figure 42:
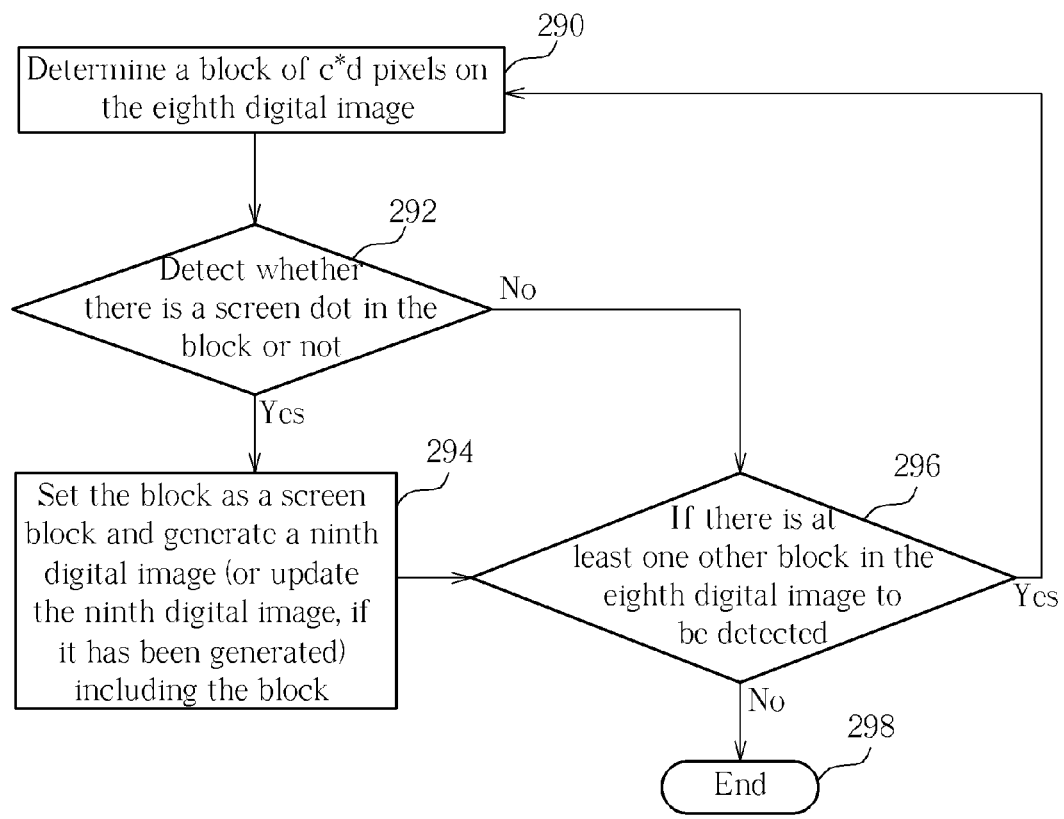
FIG. 42 is the detailed flowchart of integrating the detected screen dots according to the second embodiment of the present invention.

After determining screen dots in the eighth digital image, integrate all the detected, spotted screen dots into a complete region. First, define a screen block is a block in which each dot is a screen dot. Please refer to FIG. 42. FIG. 42 is the detailed flowchart of integrating the detected screen dots according to the second embodiment of the present invention. The steps of FIG. 42 can be further detailed as follows:

Step 290: determine a block of c*d pixels on the eighth digital image.

Step 292: detect whether there is a screen dot in the block or not. If so, go to step 294, if not, go to step 296.

Step 294: set the block as a screen block and generate a ninth digital image (or update the ninth digital image, if it has been generated) including the block.

Step 296: determine if there is at least one other block in the eighth digital image to be detected. If so, go to step 290, if not, go to step 298.

Step 298: end.

The step of integrating the detected screen dots can be performed by detecting whether there is a screen dot in a block of c*d pixels, wherein c, d are arbitrary positive integers chosen according to the characteristics of the image, such as the size, clearness, or resolution. If the block includes at least one screen dot, set the block as a screen block (set all the remaining pixels in the block as screen dots), and generate a ninth digital image (or update the ninth digital image, if it has been generated) including the block. The block is chosen from top to bottom, and from left to right in the eighth digital image until the whole eighth digital image has been gone through once. Please refer to FIG. 43. FIG. 43 is a drawing of the procedures of integrating the detected screen dots according to the second embodiment of the present invention. Please note that provided that the result is substantially the same, the steps are not required to be executed in the exact order shown in FIG. 42.

After the steps of peak/valley detection and integrating the detected screen dots, according to the second embodiment, the following steps included in the screen dot detection method are peak block connection, removing the blocks chosen incorrectly, and expanding the detected region of the photo, similar to the steps of the first embodiment. Therefore, the description is omitted here for the sake of brevity.

Figure 44:
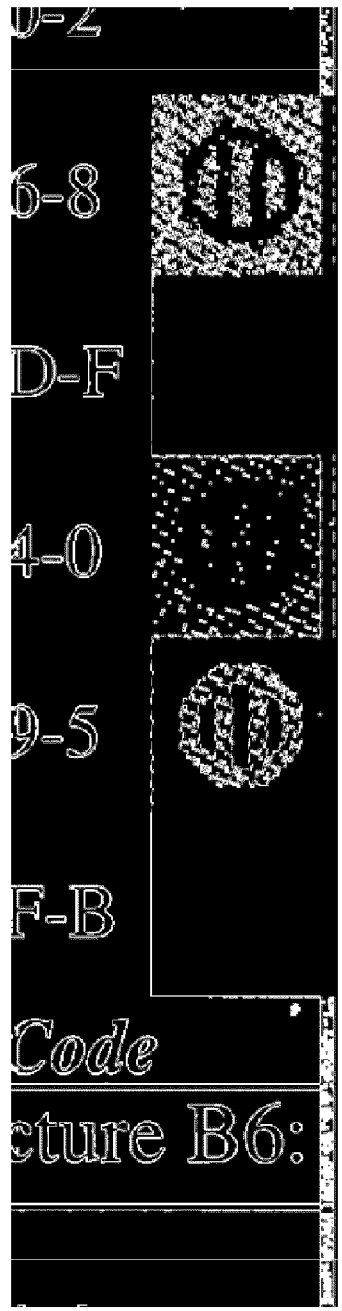
FIG. 44 is a drawing of the result of edge detection according to FIG. 3.
Figure 45:
FIG. 45 is a drawing of the result of screen dot detection according to FIG. 3.
Figure 46:
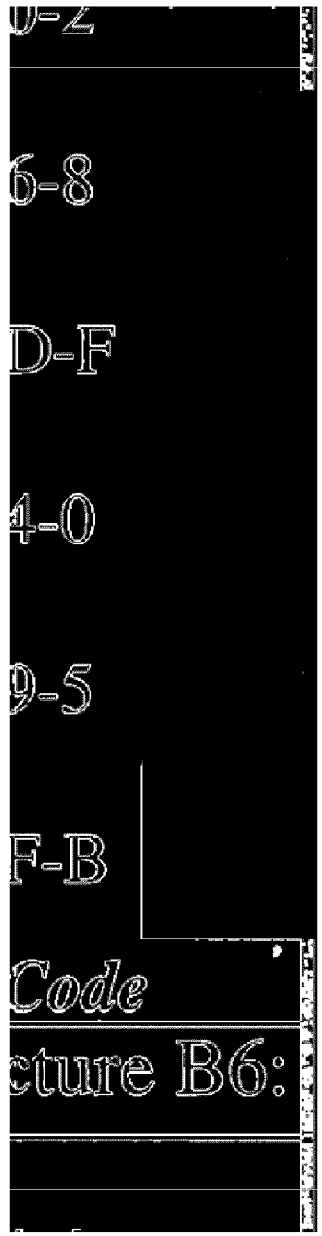
FIG. 46 is a drawing of the result of removing the photo detected by the screen dot detection from the third digital image generated from the edge detection step according to FIG. 44 and FIG. 45.

After the screen dot detection, remove the photo region detected by the screen dot detection from the third digital image generated from the edge detection step. Please refer to FIG. 44, FIG. 45, and FIG. 46 in all. FIG. 44 is a drawing of the result of edge detection according to FIG. 3. FIG. 45 is a drawing of the result of screen dot detection according to FIG. 3, and FIG. 46 is a drawing of the result of removing the photo region detected by the screen dot detection from the third digital image generated from the edge detection step according to FIG. 44 and FIG. 45.

After removing the photo region detected by the screen dot detection from the third digital image, the process goes to the step of detecting color regions in the original digital image and removing the color regions from the third digital image to generate the non-graphic digital image. Because the color region is defined as a graph in the present invention, it should be removed so as to get the wanted region of text. Detecting the color region is performed through detecting the chrominance of pixels. As mentioned before, the present invention transforms RGB of the pixels into YCaCb to separate data of luminance and chrominance. In YCaCb information, the luminance of each pixel is represented by data of Y, and the chrominance of each pixel is represented by data of CaCb. Therefore, it's easy to detect a color pixel through CaCb data.

Figure 47:
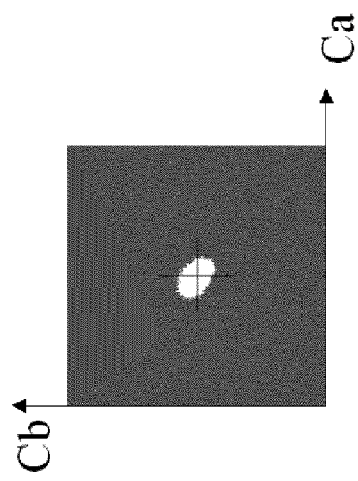
FIG. 47 is a drawing of the chrominance distribution according to CaCb data; wherein the center white region of FIG. 47 is the region of neutral color.
Figure 48:
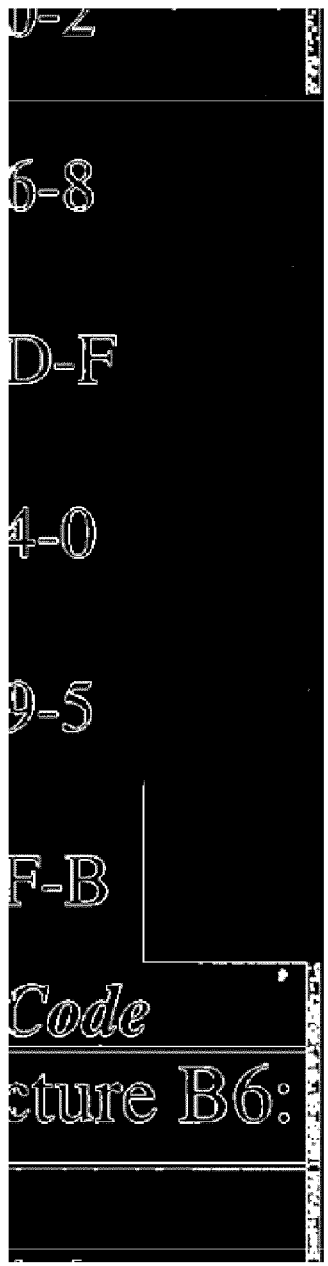
FIG. 48 is a drawing of the region of detected edges including text and color lines after performing steps 100, 200, 300 on FIG. 4.
Figure 49:
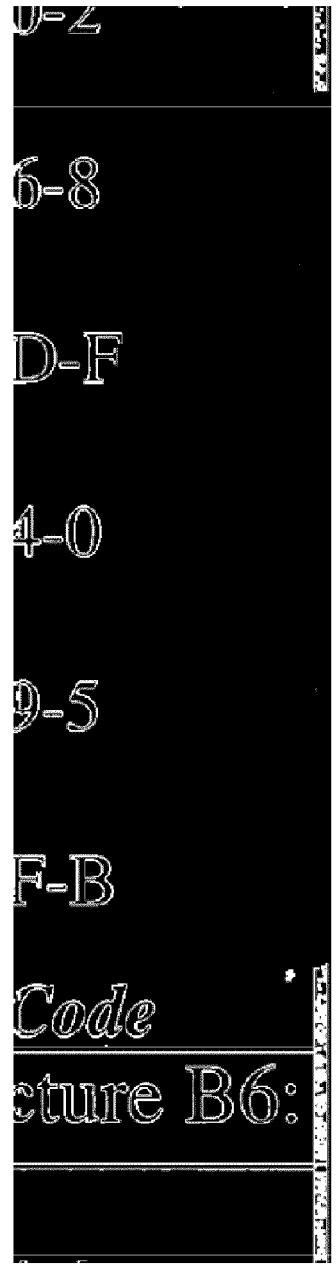
FIG. 49 is a non-graphical digital image generated after removing the detected color regions from the third digital image according to FIG. 3 and FIG. 48.

Please refer to FIG. 47, FIG. 48, and FIG. 49. FIG. 47 is a drawing of the chrominance distribution according to CaCb data. The center white region of FIG. 47 is the region of neutral color. FIG. 48 is a drawing of the detected edges including text and color lines after performing step 100, 200, 300 in FIG. 5 according to FIG. 3. FIG. 49 is the non-graphical digital image generated after removing the detected color regions from the third digital image according to FIG. 3 and FIG. 48.

At last, the regions surrounded by the remaining detected edges can be determined as non-graphical regions (text). Therefore, generate the non-graphical digital image according to the non-graphical regions. Subsequently the non-graphical digital image (text) can be enhanced or copied separately in order to represent a desired effect, instead of performing the processing on the whole digital image of the printed page, such as enhancing or copying, which may cause unexpected defects and unwanted results in exhibition of the whole digital image.

To sum up, the present invention also utilizes a high and a low luminance threshold to decrease the calculations and operations of the edge detection so as to save the cost and resources of the edge detection. Moreover, a Discrete Fourier Transform is newly applied to the screen dot detection step by the present invention. And besides Discrete Fourier Transform, the present invention also releases several steps including peak/valley detection, integrating the detected screen dots, peak block connection, removing the blocks chosen incorrectly, and expanding the detected region of the photo to complete the screen dot detection, which is also a new arrangement and invention in this field.

Those skilled in the art will readily observe that numerous modifications and alterations of the device and method may be made while retaining the teachings of the invention.

What is claimed is:

1. A method for generating a non-graphical digital image from an original digital image, comprising:
    detecting first areas of the original digital image whose luminance values are above a first predetermined luminance threshold;
    detecting second areas of the original digital image whose luminance values are below a second predetermined luminance threshold, the second predetermined luminance threshold being smaller than the first predetermined luminance threshold;
    dilating the first areas to generate a first digital image;
    dilating the second areas to generate a second digital image;
    generating a third digital image including edges from dilated first and second areas;
    performing screen dot detection in the original digital image for detecting photo regions;
    detecting color regions in the original digital image; and
    removing the photo regions and the color regions from the third digital image to generate the non-graphical digital image.

2. The method of claim 1 wherein detecting the color regions in the original digital image comprises detecting the color regions in the original digital image through chrominance of pixels.

3. The method of claim 1 wherein generating the third digital image including the edges from the dilated first and second areas comprises intersecting the dilated first and second areas to generate the edges.

* * * * *